US008642262B2

(12) United States Patent
Stroman et al.

(10) Patent No.: US 8,642,262 B2
(45) Date of Patent: Feb. 4, 2014

(54) LIVESTOCK MANAGEMENT SYSTEMS AND METHODS

(75) Inventors: Richard D. Stroman, Indialantic, FL (US); Khurshid A. Afimiwala, Shelton, CT (US); James B. Gibb, Louisville, CO (US); Philip C. Brink, Erie, CO (US); Scott L. Crain, Meade, KS (US); Timothy G. Niedecken, Sebastian, FL (US)

(73) Assignee: MWI Veterinary Supply Co., Meridian, ID (US)

( * ) Notice: Subject to any disclaimer, the term of this patent is extended or adjusted under 35 U.S.C. 154(b) by 707 days.

(21) Appl. No.: 11/977,665

(22) Filed: Oct. 25, 2007

(65) Prior Publication Data

US 2008/0059534 A1 Mar. 6, 2008

Related U.S. Application Data

(62) Division of application No. 10/071,437, filed on Feb. 7, 2002, now abandoned.

(51) Int. Cl.
*C12Q 1/68* (2006.01)
*G08B 23/00* (2006.01)
*A01K 29/00* (2006.01)

(52) U.S. Cl.
USPC ....... 435/6.11; 435/6.12; 435/6.14; 435/6.17; 435/7.1; 340/573.3; 119/174; 119/51.02; 235/375; 600/300; 705/7.11

(58) Field of Classification Search
None
See application file for complete search history.

(56) References Cited

U.S. PATENT DOCUMENTS

| 3,727,581 | A | * | 4/1973 | Brent ........................... 119/453 |
| 3,845,718 | A | * | 11/1974 | Rogers et al. ............ 104/130.07 |
| 3,929,277 | A | | 12/1975 | Byrne et al. |
| 4,256,569 | A | | 3/1981 | Wallace |
| 4,532,892 | A | | 8/1985 | Kuzara |
| 4,597,495 | A | | 7/1986 | Knosby |
| 4,618,861 | A | | 10/1986 | Gettens et al. |
| 5,028,918 | A | | 7/1991 | Giles et al. |
| 5,071,298 | A | | 12/1991 | Conzett |
| 5,292,639 | A | * | 3/1994 | Beitz et al. .................. 435/6.12 |
| 5,315,505 | A | | 5/1994 | Pratt et al. |
| 5,322,034 | A | | 6/1994 | Willham et al. |
| 5,355,833 | A | | 10/1994 | Legrain |
| 5,478,990 | A | * | 12/1995 | Montanari et al. ............ 235/375 |

(Continued)

FOREIGN PATENT DOCUMENTS

GB 2308947 A 9/1997

OTHER PUBLICATIONS

Mariental Abattoir Under Threat; The Namibian; Source: World Reporter; Feb. 23, 2001; 1-page.*
Office action dated Dec. 6, 2007, in U.S. Appl. No. 10/071,437.

(Continued)

*Primary Examiner* — Gregory Johnson
(74) *Attorney, Agent, or Firm* — Klarquist Sparkman, LLP

(57) ABSTRACT

This invention relates to systems and methods for managing livestock, such as cattle, from conception to consumption. More particularly, this invention relates to systems and methods in which users, such as producers, feedlot managers, packers, buyers, sellers, and consumers, are brought together through shared information and improved communication. Users may access one or more applications, tools, and/or systems to increase the value of each animal, monitor and track each animal, and improve the efficiency of their operation.

17 Claims, 28 Drawing Sheets

(56) References Cited

U.S. PATENT DOCUMENTS

| | | | |
|---|---|---|---|
| 5,483,441 A | | 1/1996 | Scofield |
| 5,510,099 A | * | 4/1996 | Short et al. .................. 800/3 |
| 5,614,364 A | * | 3/1997 | Tuggle et al. ............. 435/6.12 |
| 5,673,647 A | | 10/1997 | Pratt |
| 5,715,185 A | * | 2/1998 | Carter ..................... 705/7.38 |
| 5,849,488 A | * | 12/1998 | Alatossava et al. ......... 435/6.14 |
| 5,872,314 A | * | 2/1999 | Clinton ....................... 73/602 |
| 5,887,176 A | | 3/1999 | Griffith et al. |
| 5,955,056 A | * | 9/1999 | Short et al. ................ 424/9.2 |
| 5,960,105 A | | 9/1999 | Brethour |
| 6,000,361 A | * | 12/1999 | Pratt ...................... 119/51.02 |
| 6,058,379 A | | 5/2000 | Odom et al. |
| 6,082,304 A | | 7/2000 | Crain |
| 6,144,953 A | | 11/2000 | Sorrells et al. |
| 6,211,789 B1 | * | 4/2001 | Oldham et al. ........... 340/573.3 |
| 6,231,435 B1 | | 5/2001 | Pilger |
| 6,242,191 B1 | | 6/2001 | Fluharty et al. |
| 6,342,839 B1 | | 1/2002 | Curkendall et al. |
| 6,346,885 B1 | | 2/2002 | Curkendall et al. |
| 6,374,178 B2 | | 4/2002 | Nakagawa et al. |
| 6,383,751 B1 | * | 5/2002 | Barendse .................. 435/6.11 |
| 6,424,727 B1 | * | 7/2002 | Musgrave et al. ........... 382/117 |
| 6,427,627 B1 | | 8/2002 | Huisma |
| 6,460,020 B1 | * | 10/2002 | Pool et al. .................. 705/7.29 |
| 6,470,825 B1 | * | 10/2002 | Johnson et al. ........... 119/51.02 |
| 6,497,197 B1 | | 12/2002 | Huisma |
| 6,509,187 B2 | * | 1/2003 | Brem ...................... 435/288.2 |
| 6,570,060 B2 | * | 5/2003 | McLachlan ..................... 800/8 |
| 6,610,496 B1 | * | 8/2003 | Dahl et al. .................. 435/7.1 |
| 6,662,192 B1 | | 12/2003 | Rebane |
| 6,664,897 B2 | * | 12/2003 | Pape et al. ................. 340/573.3 |
| 6,730,023 B1 | * | 5/2004 | Dodds ......................... 600/300 |
| 6,734,338 B1 | * | 5/2004 | Readhead et al. ............. 800/23 |
| 6,849,401 B1 | * | 2/2005 | Andersson et al. .......... 435/6.17 |
| 6,868,804 B1 | | 3/2005 | Huisma |
| 6,889,197 B2 | | 5/2005 | Lidow |
| 6,900,731 B2 | | 5/2005 | Kreiner et al. |
| 6,990,459 B2 | | 1/2006 | Schneider |
| 7,030,779 B1 | * | 4/2006 | Jancik et al. .................. 340/945 |
| 7,115,795 B1 | * | 10/2006 | Forsberg et al. ............... 800/14 |
| 7,294,755 B1 | * | 11/2007 | Readhead et al. ............. 800/22 |
| 7,353,181 B2 | * | 4/2008 | Nel ............................ 705/7.22 |
| 7,395,237 B1 | * | 7/2008 | Hall et al. ...................... 705/37 |
| 7,440,901 B1 | | 10/2008 | Dlott et al. |
| 7,543,549 B2 | | 6/2009 | Valencia et al. |
| 7,584,136 B2 | | 9/2009 | Shuler et al. |
| 7,603,284 B2 | | 10/2009 | Stroman et al. |
| 7,670,292 B2 | | 3/2010 | Haynes et al. |
| 7,681,527 B2 | | 3/2010 | Pratt |
| 7,726,258 B2 | | 6/2010 | Pratt |
| 2002/0010390 A1 | | 1/2002 | Guice et al. |
| 2002/0022772 A1 | * | 2/2002 | Dodds ......................... 600/300 |
| 2002/0049622 A1 | * | 4/2002 | Lettich et al. ..................... 705/7 |
| 2002/0049660 A1 | * | 4/2002 | Obrador et al. ................. 705/37 |
| 2002/0059030 A1 | | 5/2002 | Otworth et al. |
| 2002/0065738 A1 | * | 5/2002 | Riggs et al. ..................... 705/26 |
| 2002/0065765 A1 | | 5/2002 | Shuler et al. |
| 2002/0077718 A1 | | 6/2002 | Harburda et al. |
| 2002/0087371 A1 | * | 7/2002 | Abendroth ....................... 705/7 |
| 2002/0096123 A1 | * | 7/2002 | Whittier et al. ............... 119/174 |
| 2002/0103688 A1 | | 8/2002 | Schneider |
| 2002/0123911 A1 | * | 9/2002 | Bjerre et al. ..................... 705/5 |
| 2002/0132290 A1 | * | 9/2002 | Frazer et al. ................. 435/69.1 |
| 2002/0137033 A1 | * | 9/2002 | Brem ............................ 435/6 |
| 2002/0158765 A1 | | 10/2002 | Pape et al. |
| 2002/0166129 A1 | * | 11/2002 | McLachlan ..................... 800/7 |
| 2002/0184068 A1 | | 12/2002 | Krishnan et al. |
| 2002/0187480 A1 | * | 12/2002 | Brandon ......................... 435/6 |
| 2003/0013942 A1 | * | 1/2003 | Dodds .......................... 600/300 |
| 2003/0046133 A1 | * | 3/2003 | Morley et al. .................... 705/8 |
| 2003/0060924 A1 | * | 3/2003 | Ye et al. ....................... 700/217 |
| 2003/0082537 A1 | * | 5/2003 | Stanton, Jr. ...................... 435/6 |
| 2003/0083913 A1 | | 5/2003 | Wolfe et al. |
| 2003/0140865 A1 | * | 7/2003 | Fuqua ........................ 119/174 |
| 2003/0216993 A1 | * | 11/2003 | Goldwerger et al. ........... 705/37 |
| 2004/0049428 A1 | | 3/2004 | Soehnlen et al. |
| 2004/0115678 A1 | * | 6/2004 | Barendse ....................... 435/6 |
| 2004/0241723 A1 | * | 12/2004 | Marquess et al. ................ 435/6 |
| 2004/0242511 A1 | * | 12/2004 | Fisher et al. .................... 514/44 |
| 2005/0102106 A1 | * | 5/2005 | Brandon ........................ 702/20 |
| 2006/0054092 A1 | | 3/2006 | Valencia et al. |

OTHER PUBLICATIONS

Abbass et al., "Knowledge Discovery in Dairy Cattle Database (Mining for Predictive Models)," *Queensland University of Technology, Technical Report TR-FIT-99-01*, 11 pp., 1999.

Ascough et al., "GPFARM: An Integrated Decision Support System for Sustainable Great Plains Agriculture," *10th International Soil Conservation Organization Meeting*, 10 pp., May 1999.

Downs et al., "Legal Implications in Development and Use of Expert Systems in Agriculture," *Journal of Agricultural Ethics*, vol. 2, pp. 53-58, 1989.

Drugan, "Chartering an Easier Course," *Gale Group Trade & Industry DB*, 4 pp., Nov. 1983.

"eMerge Interactive Delivers Livestock Industry On-line Solutions," *Business Wire*, 2 pp., Jun. 7, 1999.

Holt, "Computers in Production Agriculture," *Science*, vol. 228, 11 pp., Apr. 26, 1985.

Klose, "A Decision Support System for Agricultural Producers," Dissertation submitted to the Office of Graduate Studies of Texas A&M University, 111 pp., May 2001.

Korver, "Modeling Livestock Production Systems," *Kluwer Academic Publishers*, 11 pp., 1988.

Office Action dated Dec. 16, 2008, in corresponding U.S. Appl. No. 11/977,673, 20 pp.

Final Office Action dated Jan. 9, 2009, in corresponding U.S. Appl. No. 11/977,625, 9 pp.

Office action dated Apr. 2, 2008, in U.S. Appl. No. 11/977,625.

Halberg, "Indicators of resource use and environmental impact for use in a decision aid for Danish livestock farmers," *Agriculture, Ecosystems & Environment*, vol. 76, pp. 17-30 (1999).

Hooda et al., "A review of water quality concerns in livestock farming areas," *The Science of the Total Environment*, vol. 250, pp. 143-167 (2000).

Quansah et al., "Farmer's perceptions and management of soil organic matter—a case study from West Africa," *Nutrient Cycling in Agroecosystems*, vol. 61, pp. 205-213 (2001).

Office Action dated Jul. 1, 2008, in U.S. Appl. No. 11/977,511.

Borland Software Co., "Delphi Case Study: Triple Point Technology, Inc." (Jun. 6, 2001).

Coleman Natural Products, Inc., "Coleman Natural Beef: Certified Organic by Coleman Natural Products, Inc." (2000).

Cornett, "Fast-Track Sorting," *Beef*, pp. 16-19 (Aug. 1994).

eBay, Inc., "Internet Shopping Network and eBay Partner to Expand Auction Capabilities" (Jan. 13, 1998).

Gerke, "Consider Disposition in Genetic Selection," *Drovers Journal*, Section: Tools and Strategies (Jun. 1, 2001).

Hardin, "DECI (Decision Evaluator for the Cattle Industry): Information Age Tool for the Cattle Industry," *Agricultural Research* (May 1998).

Henderson, "Superior Genetics, Guaranteed Health," *Drovers Journal*, Section: Tools and Strategies (Sep. 1, 2001).

Leu, "Cow Herd Improvement Program Services (CHIPS): 2001 Update," *Iowa State University Extension* (2001).

Maday, "Building a Value Chain," *Drovers Journal*, Section: Tools and Strategies (Sep. 14, 2001).

Maday, "Different Strokes," *Drovers Journal*, Section: Food Systems International (Mar. 1, 2001).

Midwest MicroSystems, LLC, "Cow Sense: Herd Management Software."

Qualcomm, Inc., "Qualcomm Wireless Business Solutions" (2001).

SCA Technologies, LLC, "Solutions: Case Histories: Saving Significant Costs by Restructuring McDonald's Various Meat Supply Chains" (2001).

Smith, "Increasing Value in the Supply Chain," Presented at the 81st Annual Conference of the Canadian Meat Council in Vancouver, British Columbia, Canada (Feb. 9, 2001).

(56) References Cited

OTHER PUBLICATIONS

Smith et al., "Traceback, Traceability and Source Verification in the U.S. Beef Industry," Presented at the XXI World Buiatrics Congress (Dec. 5, 2000).
Stough, "A National System," *Drovers Journal*, Section: Tools and Strategies (Feb. 1, 2000).
Stough, "A New View of Your Herd," *Drovers Journal*, Section: Tools and Strategies (Jan. 1, 2000).
Summers, "Bullish on Technology," *The Lane Report*, pp. 23-26 (Aug. 2001).
Triple Point Technology, Inc., "Triple Point Technology Launches Next-Generation Commodity Trading System—Tempest XL" (Aug. 23, 2001).
United States Dept. of Agriculture, "Agricultural Marketing Service: Rule 7 CFR Part 205" (Dec. 21, 2000).
U.S. Dept. of Agriculture and U.S. Environmental Protection Agency: Office of Wastewater Management, "Unified National Animal Feeding Operations (AFO) Strategy: Executive Summary" (Mar. 9, 1999).
U.S. Dept. of Agriculture, "Institutional Meat Purchase Specifications: For Fresh Beef Products Series 100" (Jun. 1996).
U.S. Federal Trade Commission, "Internet Auctions: A Guide for Buyers and Sellers" (Sep. 2000).
Frost et al., "A Review of Livestock Monitoring and the Need for Integrating Systems," *Computers and Electronics in Agriculture*, 17, pp. 139-159 (1997).
Office Action dated Sep. 5, 2008, in U.S. Appl. No. 10/071,437, 16 pp.
Office Action dated Oct. 30, 2008, in U.S. Appl. No. 11/999,744, 15 pp.
"Commercial Transportation of Equines to Slaughter," United States Dept. of Agriculture, Dialog File 180, Accession No. 02492021, 26 pp., May 1999.
"Commercial Transportation of Equines to Slaughter," US Department of Agriculture, vol. 66, No. 236, 67 pp., Dec. 7, 2001.
"Feedlot Management Primer—Chapter 2—Shipping and Receiving Cattle," Ohio State University Extension, Mar. 2002, retrieved from Archive.org, 9 pp., Dec. 8, 2009.
"Transponder Technology—Resource Identification and Tracking," US Department of Agriculture, Forest Service, 24 pp., Jun. 1998.
Calder et al., "A beef producer initiative in traceability: Scottish Borders TAG," *Supply Chain Management*, 5 pp., 1998.
Camp T.H. et al., "Transit Factors Affecting Shrink, Shipping Fever and Subsequent Performance of Feeder Calves," *Journal of Animal Science*, vol. 52, No. 6, 6 pp., 1981.
Caporale et al., "Importance of the traceability of animals and animal products in epidemiology," *Rev. sci tech.* Off. Int. Epiz., 7 pp., 2001.
Church, John Scott, "The Effects of Production Practices on the Behaviour of Ruminant Animals," University of Alberta, 134 pp., Spring 1997.
Cole, N. A. et al., "Effect of transport on feeder calves," *American Journal of Veterinarian Science*, vol. 29, No. 2, 1 p., Feb. 1988.
Eradus et al., "Animal identification and monitoring," *Computers and Electronics in Agriculture*, 8 pp., 1999.
Final Office Action dated May 4, 2009, from the U.S. Patent and Trademark Office, in U.S. Appl. No. 11/977,673, 23 pp.
Final Office Action dated Jun. 24, 2010, from the U.S. Patent and Trademark Office, in U.S. Appl. No. 11/977,511, 18 pp.
Final Office Action dated Apr. 22, 2009, from the U.S. Patent and Trademark Office, in U.S. Appl. No. 11/977,511, 18 pp.
Final Office Action dated Jul. 20, 2010, in U.S. Appl. No. 11/977,673, 28 pp.
Fox et al., "A Decision Support System for Individual Cattle Management," *Proc. Cornell Nutr. Conf. Feed Manuf.*, 13 pp., 2001.
Fulton, Robert W. et al., "Evaluation of health status of calves and the impact on feedlot performance," *Can J Vet Res*, vol. 66, No. 3, 9 pp., Jul. 2002.

Geers, "Food quality and safety, Traceability and transparency from "fork to farm," risk and quality assurance, Telemetric data collection for quality care of pig production," Catholic University of Leuven, 9 pp., 1996.
Geers, "Electronic identification and monitoring of pigs during housing and transport," *Computers and Electronics in Agriculture*, vol. 17, 11 pp., 1997.
Geers, "TETRAD: an on-line telematic surveillance system for animal transports," *Computers and Electronics in Agriculture*, vol. 21, 1998, 10 pp.
Madec, "Traceability in the pig product chain," *Review Science Technology International*, Epiz, vol. 20, No. 2, 2001, 15 pp.
Naas, Irenilza de Alencar, "Applications of Mechatronics to Animal Production," Brazil, 2002, 14 pp.
Non-Final Office Action dated May 27, 2009, from the U.S. Patent and Trademark Office, in U.S. Appl. No. 10/071,437, 17 pp.
Non-Final Office Action dated Nov. 27, 2009, from the U.S. Patent and Trademark Office, for U.S. Appl. No. 11/977,511, 19 pp.
Non-final Office Action dated Dec. 23, 2009, from the U.S. Patent and Trademark Office, in U.S. Appl. No. 11/977,673, 20 pp.
Notice of Allowance dated Jun. 3, 2009, from the U.S. Patent and Trademark Office in U.S. Appl. No. 11/977,625, 36 pp.
Fulhage, "Land Application Considerations for Animal Manure," University of Missouri Extension, EQ202, 7 pp., Jun. 2000.
Fulhage, "Reduce Environmental Problems with Proper Land Application of Animal Manure," University of Missouri Extension, EQ201, 7 pp., Jun. 2000.
Moore et al., "Calculating the fertilizer value of manure from livestock operations," Extension circular EC 1094—Oregon State University, Extension Service, 9 pp., Jun. 1991.
Office action, dated Feb. 4, 2011, issued by the U.S. Patent and Trademark Office, for related U.S. Appl. No. 11/977,511, filed Oct. 25, 2007, 25 pp.
Pfost et al., "Beef Manure Management Systems in Missouri," University of Missouri Extension, EQ377, 12 pp., Oct. 2000.
Pfost et al., "Odors from Livestock Operations: Causes and Possible Cures," University of Missouri Extension, G1884, 7 pp., Oct. 1999.
Office action dated Apr. 4, 2011, issued by the U.S. Patent and Trademark Office, for co-pending U.S. Appl. No. 11/977,623, 27 pp.
Final Office action, issued Oct. 1, 2012 by the U.S. Patent and Trademark Office, for U.S. Appl. No. 11/977,509, 15 pp.
Office Action, issued Mar. 27, 2012, by the U.S. Patent and Trademark Office, for U.S. Appl. No. 11/977,509, 28 pp.
Office Action, issued Mar. 29, 2012, by the U.S. Patent and Trademark Office, for U.S. Appl. No. 11/977,623, 11 pp.
Office Action, issued Jun. 22, 2012, by the U.S. Patent and Trademark Office, for U.S. Appl. No. 11/999,744, 22 pp.
Final Office action, issued Feb. 2, 2012, by the U.S. Patent and Trademark Office, for related U.S. Appl. No. 11/977,508, 31 pp.
Final Office action, issued Nov. 17, 2011, by the U.S. Patent and Trademark Office, for related U.S. Appl. No. 11/977,623, 11 pp.
Goforth et al., "Appropriate Regulation of Antibiotics in Livestock Feed," *Boston College Environmental Affairs Law Review*, vol. 28, No. 1, 39 pp., Fall 2000.
Office action, issued Aug. 24, 2011, by the U.S. Patent and Trademark Office, for related U.S. Appl. No. 11/977,508, 45 pp.
Cole, "Intake control systems," USA, Agricultural Research Service, pp. 156-161, 1995.
Geers, "Electronic identification, monitoring and tracking of animals," CAB International, Abstract, 3 pp., 1997.
Gibb et al., "Bunk Attendance of feedlot cattle monitored with radio frequency technology," *Canadian Journal of Animal Science*, vol. 78, Issue 4, pp. 707-710, Dec. 1998.
Growsafe.com web pages, Growsafe, 2 pp., Jan. 2001, retrieved from Archive.org Jan. 7, 2011.
Machine Learning definition, Wikipedia.org., 7 pp., Retrieved Jan. 10, 2011.
McAllister et al., "Electronic identification: Applications in beef production and research," *1999 annual meeting of the Canadian Society of Animal Science*, pp. 381-392, 1999.

(56) References Cited

OTHER PUBLICATIONS

Office action, dated Jan. 13, 2011, issued by the U.S. Patent and Trademark Office for related U.S. Appl. No. 11/977,673, filed Oct. 25, 2007, 26 pp.

Perry et al., "The Use of Electronic Identification and Monitoring to Evaluate Feed Consumption, Weight Gain and Feed Efficiency of Feedlot Cattle," *San Joaquin Experimental Range Research Notes*, CATI Publication #970502, 3 pp., May 1997.

Schwartzkopf-Genswein, "Validation of a radio frequency identification system for monitoring feed patterns of feedlot cattle," *Livestock Production Science*, vol. 60, pp. 27-31, 1999.

Schwartzkopf-Genswein, "Feedbunk Detective," *Beef*, 3 pp., Oct. 1, 1998.

Sowell et al., "Feeding and Watering Behavior of Healthy and Morbid Steers in a Commercial Feedlot," *Journal of Animal Science*, vol. 77, pp. 1105-1112, 1999.

* cited by examiner

1400

Company A: Branded Beef Programs

You have chosen to participate in:
Branded Beef 3

For your animals to be certified under this program, the following guidelines must be met:

① Guideline 1
② Guideline 2
· · ·
③ Guideline 3

From: complete@companya.com

To: Rancher <rancher@email.com>

Subject: Completed Branded Beef 3

Dear Rancher,

Congratulations! Your animals have completed Branded Beef 3. The following is a valuation of the procedures and treatments administered to your animal.

For: Your Animal
Valuation ...

COMPLIANCE ENFORCEMENT

User's Actions — Summary

Purchased Vaccine A on 2/1/00
Medical Record Created on 2/15/00
Genetic Test Results from 2/16/00
. . .

Analysis of User's Actions

User has complied with the following programs:

Program A
Branded Beef B and is entitled to the following incentives:
$100/steer + market price

LIVESTOCK MANAGEMENT SYSTEMS AND METHODS

CROSS REFERENCE TO RELATED APPLICATION

This application is a divisional of U.S. patent application Ser. No. 10/071,437, filed Feb. 7, 2002, now abandoned and incorporated herein by reference.

BACKGROUND

This invention relates to systems and methods for managing livestock, such as cattle, from conception to consumption. More particularly, this invention relates to systems and methods in which members of the livestock production chain, such as producers, feedlot managers, packers, and retailers, are brought together through an Internet-based platform which integrates information, technology-based tools, and electronic commerce designed to improve communication throughout the livestock industry and to provide systems and methods for tracking animal performance, creating increased value, and improving overall operational efficiency and quality.

The livestock industry is a multi-billion dollar business. Beginning at the producer or ranch level, owners typically raise animals until they are a certain age and weight. Livestock owners sell a majority of their animals via local auction sale barns or through order buyers. Sometimes the livestock are purchased by buyers acting on behalf of feedlots or stocker operations. After sorting and commingling the animals, which may occur several times, the animals are sold to the feedlots or stocker operations. Typically, all animals eventually end up at feedlots (sold or under retained ownership) where they are grown to selling weight. Finally, the livestock are sold to packers (e.g., a slaughterhouse) for harvesting and delivery to retail and food service distributors. Throughout this process, the livestock industry must meet consumer demands for quality, consistency, animal welfare, cost, and convenience.

Typically, producers, such as ranchers, may enroll in branded beef or marketing programs to increase their livestock's revenue potential. A branded beef or marketing program typically requires that the animals are processed according to specific guidelines. However, there is no standard method for verifying that a rancher has complied with the program's guidelines. Typically, branded beef programs are verified by verbal acknowledgment, which at times may cause distrust amongst producers and buyers.

In conjunction with the lack of verification capabilities, there is a need for monitoring and tracking animals as they move through the supply chain. For example, during the auctioning phase, it is typical for the animals to commingle. The animals may be commingle at assimilation sites and then later sorted for shipment to customers as a truckload. Once the animals commingle, they lose their identity, and with each subsequent commingling, owners and buyers possess less information about each individual animal. Therefore, due to commingling and other practices of conventional livestock marketing, even the healthiest animal becomes an anonymous commodity. This creates a need for more efficient and more humane sorting, transportation, handling, monitoring, and tracking methods.

As a result of losing information on each animal, such as a calf's vaccination and health history, the cost of healthcare for animals increases. For example, without vaccination histories on individual animals, feedlot managers may vaccinate all the animals upon arrival to their facility to minimize sickness and death. With vaccination and health histories for each animal along with current status such as weight and temperature, feedlot managers may more appropriately treat each animal with a specific health regiment.

Typically, feedlot managers feed the animals until the animals are at their optimal selling weight. The feedlot typically includes a multitude of pens that are utilized to confine the animals during their final growth phase. During the final growth phase, each pen is provided with a given amount of feed per day. The animals gain weight at different rates and there is a need for identifying the optimal time for selling them to packers. It is also difficult to access performance records of various feedlots. Feedlot managers may desire to compare operational and performance parameters of their feedlots with other feedlots.

In addition, many people, such as cowhands and feedlot personnel, are required to attend to the animals at ranches and feedlots. These people provide valuable insight by relying on personal experiences, visual observations, and measurements. However, there is a growing shortage of these people in the industry.

Information is as critical to the livestock industry as it is to any other business. Members of the livestock production chain need information such as complete weather reports, commodity and futures prices, performance data on each animal, breaking industry news, and in-depth analyses by industry experts. They also require recommendations and insight from experts, such as veterinarians, processing crews, etc. Unfortunately, most livestock owners lose valuable time consulting multiple sources to obtain the necessary information and recommendations.

Other individuals have attempted to solve these problems. For example, Pratt U.S. Pat. No. 5,673,647 and Pratt U.S. Pat. No. 6,000,361 describe an automated method and system for providing individual animal electronic identification, measurement and value based management of cattle in a large cattle feedlot. In the '647 and '361 patents, Pratt describes a process wherein a computer stores individual animal measurement, performance and location data, which is used by management to select animals for shipment from the feedlot for slaughter at the optimum time.

As a result, livestock management systems and methods have been developed in which members of the livestock production chain may access a central database and application-specific programs via the Internet.

These livestock management systems and methods provide communication and integration between specific applications and tools, such as a certification system, a tracking system, a compliance enforcement system, an adaptive reasoning system, a sorting system, a genetics improvement system, an environmental management system, an adaptive logistics system, a supply and demand management system, an electronic commerce system, an integrated risk management system, and a consumer value system. These systems improve communication, provide means to track animal performance, create incremental value, and improve overall efficiency that results in a safer and more economical meat supply.

SUMMARY

This and other objects of the invention are accomplished in accordance with the principles of the present invention by providing systems and methods for managing livestock.

This invention relates to systems and methods for managing livestock, such as cattle, from conception to consumption.

More particularly, this invention relates to systems and methods in which users, such as producers, feedlot managers, packers, buyers, sellers, and consumers, are brought together through shared information and improved communication. Users may access one or more applications, tools, and/or systems to increase the value of each animal, monitor and track each animal, and improve the efficiency of their operation.

Some embodiments of the present invention may provide a user with a certification system to differentiate animals by collecting certification information on animals from conception to consumption. Collecting certification information may allow users to participate in beef marketing programs, which may increase the revenue potential of an animal. Beef marketing programs may include branded beef programs or any other marketing programs. The certification system may assist a user in selecting a beef marketing program best suited to the user's operation. Upon selecting a beef marketing program, the user may be provided with the program's requirements and may be instructed on how to meet the requirements. Upon completion of a program, the user may receive a notification. The notification may include a valuation or rating for the user's animal. The notification may also qualify the value of recommended procedures and treatments through valuation of a seller's costs and a buyer's benefits.

Some embodiments of the present invention may provide a user with a tracking system to monitor the growth and performance of an animal from conception to consumption. By implementing various devices and equipment, the tracking system may be used to document any processes and treatments performed, medical history, average daily weight gain, and any other suitable tracking information in different environments (e.g., feedlots, ranches, backgrounders, etc.). The tracking system may promote the sharing of information and building of relationships between users. The tracking system may provide a safer and thorough approach for tracking the supply of animal products.

Some embodiments of the present invention may provide a user with a compliance enforcement system to ensure that a user is following specific requirements for a branded beef or marketing program. The compliance enforcement system may acquire information from one or more sources, such as other systems, to verify the compliance of the user. Distributors, experts, or any other suitable person may enter compliance information. For example, a veterinarian may notify the compliance enforcement system when a user has purchased a vaccine. The entry of the purchase may indirectly confirm participation in a program where that vaccine is a prerequisite.

Compliance may also be determined by corresponding the purchases of products and services with the program requirements of the program (e.g., marketing, branded beef, etc.) that the user has selected. Upon passing a compliance screening and meeting the program requirements, the user may be entitled to incentives. The compliance enforcement system may provide the user with a compliance rating. In some embodiments, the compliance enforcement system may evaluate the performance of the expert, such as a veterinarian.

Some embodiments may provide a user with a data transactions system to ensure the communication of livestock-related information. In some embodiments, the data transactions system may differentiate information into such groups as privileged and private to share information with other users of the supply chain. The data transactions system may assign an access indicator to information entered or to be entered into the central database. The data transactions system may also differentiate information to protect the identity of the owner. In some embodiments, the data transactions system may provide users with an opportunity to log in. In approaches where users log in, the data transactions system may use the log in information to retrieve the user's status and accessibility during the data transaction process. The data transactions system may use user names or access codes (e.g., CiN numbers or any other suitable identification) to allow data service providers, veterinarians, organizations, and other affiliated data entry personnel to input data without compromising the security of the animal owner.

In some embodiments, data transactions system may also provide users with a notification feature. In some embodiments, data transactions system may allow the user to select particular information to be delivered to other users, such as buyers, veterinarians, organization, or any other suitable user.

Some embodiments of the present invention may provide a user with an adaptive reasoning system to simulate logic, rules, and/or good practices used by experts in the livestock industry. The adaptive reasoning system may collect adaptive reasoning information using, for example, a data acquisition system. Adaptive reasoning information may include animal observations, sensor measurements, or any other suitable information relating to adaptive reasoning. The adaptive reasoning system may retrieve historical data from the central database (obtained from other systems and applications) and compare the data with the collect adaptive reasoning information.

Based on the rules, logic, and good practices, the adaptive reasoning system may provide the user with one or more recommendations and assess the risks associated with each recommendation. When the user performs the action as recommended, the actual outcome may be compared to the expected outcome. The difference between the outcomes may be used to improve the rules, logic, and good practices maintained by the adaptive reasoning system.

Some embodiments of the present invention may provide a user with a sorting system to sort animals based on physical attributes, process attributes, any other attributes, and/or any combinations thereof. In some embodiments, the sorting system may physically sort animals based on sorting criteria inputted by the user. The sorting system may consist of one or more devices which obtain sorting information on each animal passing through the sorting system. As sorting information is obtained, the sorting system compares the sorting information to the user's sorting criteria and guides the animal into the appropriate pen. In some embodiments, the sorting system may virtually sort the animals by sending instructions to a user to, for example, notch an identification tag on an animal.

Some embodiments of the present invention may provide a user with a genetics improvement system to improve the quality of animals through genetics. The genetics improvement system may determine herd performance factors important to a user's operation. The genetics improvement system may obtain herd performance information from other operations (e.g., an operation with highly profitable performance ratings). The user may access the herd performance information to improve the user's operation.

The genetics improvement system may allow the user to input herd specification or objectives. Upon indicating the objectives of the user, the genetics improvement system may provide the user with genetic traits that influence the user's herd specifications and/or objectives. The genetics improvements system presents the user with an improvement strategy, which may include replacement bulls, planned mating, or any other suitable strategy. Upon performing the improvement strategy, the user may be provided with further goals and improvement strategies for future production cycles.

Some embodiments of the present invention may provide a user with an environmental management system to manage the environmental aspects of the user's operation so that the user complies with government regulations and protects the environment. The environmental management system may collect environmental information, which may include source material quality and quantity, land information, mapping information, and other suitable information. The environmental management system may provide the user with environmental options, such as "since the field has X pounds of phosphorus per area, the user should not apply more than Y pounds of manure." The user may be provided with the steps needed to complete the environmental options.

The environmental management system may also provide reminders to complete required activities (e.g., monitoring lagoon levels, testing air quality, etc.). The collected environmental information may assist the user in complying with government regulations. For example, the environmental management system may provide checklists for periodic environmental testing and report the environmental information to the Environmental Protection Agency (EPA).

In some embodiments, the environmental management system may provide the user with guidelines to manage contingencies, cleanups, and nuisances. The environmental management system may also provide geographical information and land application management tools for mapping and managing byproducts, such as manure. The environmental management system may also correspond the environmental information with an animal's identification tag, such as an EID tag. The user may use this information for health and performance analyses.

Some embodiments of the present invention may provide a user with an adaptive logistics system to manage the shipping arrangements of animals and/or other commodities efficiently. The adaptive logistics system may monitor shipping patterns, which may include monitoring the performance, various routes, the mortality rate, the animal handling skills, and the cleanliness of one or more truckers. Upon making a transaction with another user, the adaptive logistics system may obtain shipping details from the user. The adaptive logistics system may determine the shipping availability by identifying the available truckers based on their proximity to the pick-up and drop-off locations and past performance record. Adaptive logistics system may determine the shipping arrangement by suggesting one of the available truckers.

Upon delivery, the adaptive logistics system may allow the user to provide feedback, which may be provided in terms of the condition of the animals, animal shrinkage during shipment, mortality rate, morbidity rate, transportation time, on-time pickup and delivery, and any other suitable feedback. Adaptive logistics system 135 may further identify suitable locations for new facilities, such as eMerge facilities, assimilation sites, or any other facility, based on transportation data and committed transactions for future livestock purchases and deliveries.

Some embodiments of the present invention may provide a user with a supply and demand management system to provide the user with a real-time inventory of animals and future orders. The supply and demand management system may provide the user with trading information on the animals and assist in making a transaction to better manage their inventory. The supply and demand management system may provide the used with the flexibility to fill an order from one or more facilities (e.g., fulfill one order from three ranches).

Some embodiments of the present invention may provide a user with a electronic commerce system to manage the sales and acquisitions of the user. The electronic commerce system may be a catalog auction, a marketplace, an online brokerage, a real-time sale barn, an auction, a product catalog, an online commodity futures trading, etc. In some embodiments, the electronic commerce system may be an online catalog auction, which may solicit bids on animals. In some embodiment, the electronic commerce system may be a sale barn auction where the user may bid on an animal auctioned at a local sale barn.

The electronic commerce system may also serve as a repository of product catalogs and technical data. For example, the user may access the electronic commerce system to order spare parts and obtain information to configure newly acquired equipment. In some embodiments, the electronic commerce system may be a marketplace, where the electronic commerce system acts as a purchasing agent.

In some embodiments, the electronic commerce system may provide the user with a content management system, which provides agricultural- and livestock-related information (e.g., news). The content management system may also provide chat sites and links to facilitate education and communication between users. For example, users may be provided with online education sessions on topics, such as good management practices, risk management, and advances in genetics.

Some embodiments of the present invention may provide users with a integrated risk management system to determine risk levels and provide the user with advice on offsetting risk in the user's operation. The user must plan his or her production in advance and may consider factors, such as a downturn in the economy, a decline in exports, the cost of fuel, weather conditions, etc. The user may input material inputs to begin estimating the user's costs. The integrated risk management system may compare the user's operation against other operations. This may identify opportunities for improvement and cost reduction strategies.

The integrated risk management system may determine when the user should sell his or her product. This determination may require the user to restructure the user's operation depending on market conditions, costs, and other factors. In some embodiments, the integrated risk management system may broker relationship between users in order to minimize risks. For example, a manufacturer may reduce a user's farm equipment costs through a long-term lease.

Some embodiments of the present invention may provide a user with a consumer value system to evaluate the user's product and provide the user with feedback. The user may enter attributes or any other suitable product information. Attributes may include genetics information, completed program information, etc. The consumer value system may obtain marketing information and determine the user's consumer value. The user's consumer value may be a quality or performance rating. The user may decide to make changes to the user's operation based on the ratings. In some embodiments, the consumer value system may identify other products, which may be compatible with the user's operation. In some embodiments, the consumer value system may analyze collected attribute from other users (e.g., feedback) using an expert system. The consumer value system may provide the user with the analysis, thereby assisting the user in managing multiple animals.

BRIEF DESCRIPTION OF THE DRAWINGS

Further features of the invention, its nature and various advantages will be more apparent from the following detailed description of the preferred embodiments taken in conjunction with the accompanying drawings, in which like reference characters refer to like parts throughout, and in which:

FIGS. 5-6 are illustrative displays that may be displayed for providing certification information and program requirements, in accordance with the present invention.

FIG. 7 is an illustrative notification that may be provided to the user upon completion of a branded beef or marketing program, in accordance with the present invention.

FIG. 13 is an illustrative display that may be displayed when verifying the user's compliance information, in accordance with the present invention.

FIG. 25 is an illustrative display that may be displayed for providing the user with access to inventory or ordering information, in accordance with the present invention.

DETAILED DESCRIPTION

This invention relates to systems and methods for managing livestock, such as cattle, from conception to consumption. More particularly, this invention relates to systems and methods in which users, such as producers, feedlot managers, packers, buyers, sellers, and consumers, are brought together through shared information and improved communication.

The systems and methods may allow a user to manage one or more animals from birth to death. In some embodiments, one or more animals may be electronically detected and identified (e.g., by using RFID tags or any other suitable approach for identifying animals). By collecting and processing information relating to each animal, a user may manage the requirements of each animal. Multiple users may access information relating to each animal. For example, when a user sells an animal to a buyer, the buyer may obtain information relating to the purchased animal. The buyer may then collect information on the purchased animal and pass the information onto the next buyer, such as a packer. Users may also access one or more applications, tools, and/or systems to increase the value of each animal, monitor and track each animal, and improve the efficiency of their operation. It should be noted that the system may be implemented for the entire life cycle of an animal (e.g., from birth to death) or at multiple stages of the life of an animal (e.g., from the feedlot to the packer).

The present invention is primarily described herein in terms of "the system" and its associated subsystems (e.g., sorting system, genetics improvement system, etc.). It will be understood that the system may be any suitable, software, hardware, or both configured to implement the features of the present invention. The system may be located at a central location (e.g., a central server). In another suitable approach, the system may reside among different locations (e.g., a network).

In one particular embodiment, the system may include client-side software, hardware, or both. For example, the system may encompass one or more Web-pages or Web-page portions (e.g., via any suitable encoding, such as XML, Cold Fusion, etc.).

Although the livestock management system is described herein as being implemented on client computers, this is only illustrative. The livestock management system may be implemented on any suitable platform (e.g., personal computer, palmtop computer, laptop computer, personal digital assistant, cellular phone, etc.) to provide such features.

Figure 1:
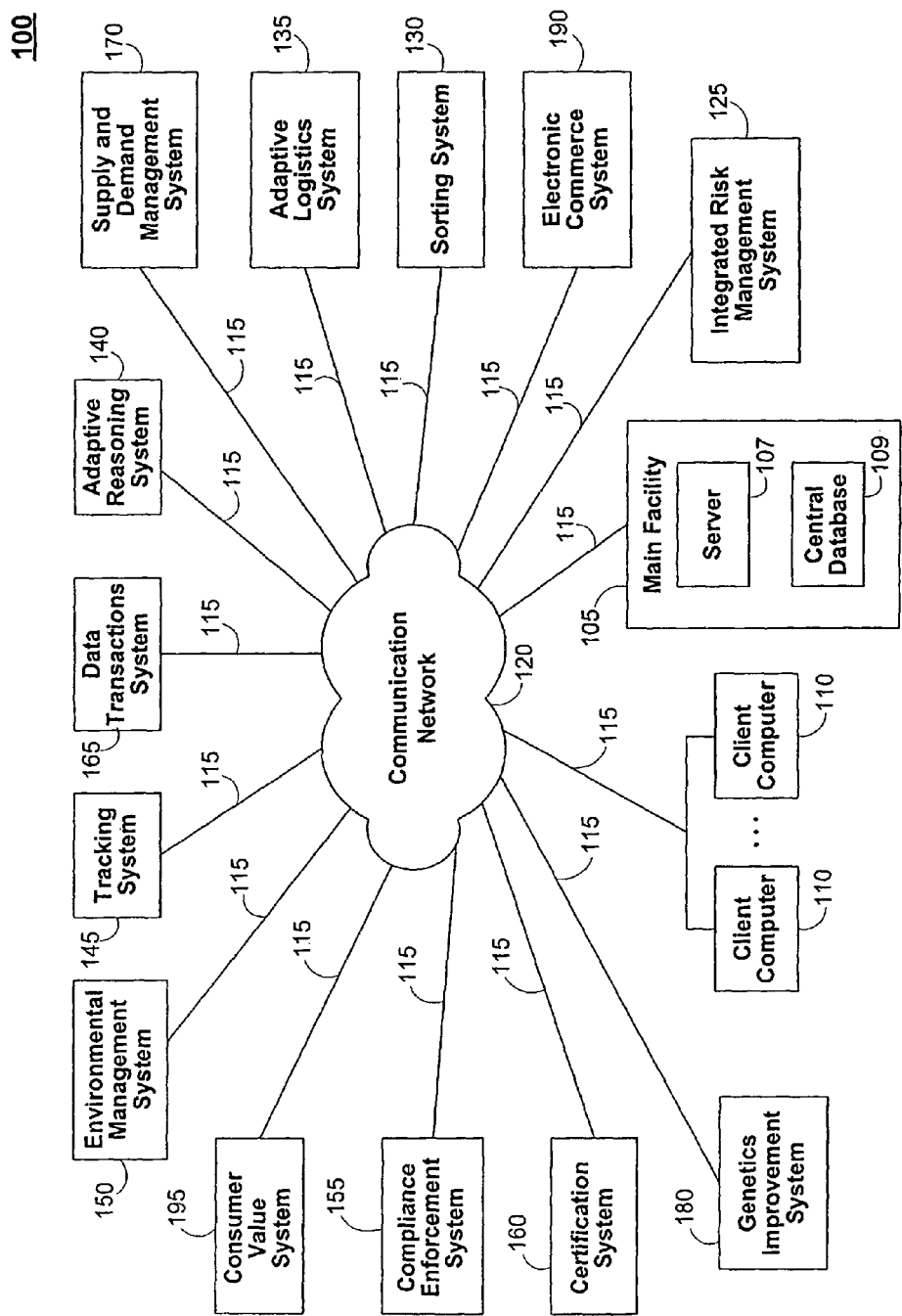
FIG. 1 illustrates an arrangement for the livestock management system, in accordance with the present invention.

One suitable arrangement of such a livestock management system is shown in FIG. 1, which shows illustrative livestock management system 100 constructed in accordance with the present invention. The livestock management system of the present invention may be implemented using any suitable communications network. In the illustrative arrangement of FIG. 1, client computers 110 may be connected via links 115 to a communication network 120. Client computer 110 may include any device or combination of devices suitable for providing communications to a user of the system. Client computer 110 may include, for example, any suitable personal computer, portable computer, palmtop computer, handheld personal computer, personal digital assistant, combined cellular phone and personal digital assistant, set-top box (e.g., a Web TV enabled set-top box), or other suitable device.

Main facility 105 contains a central database 109 for storing information, such as electronic identification numbers, vaccination history, genetic information, drug efficacy, certification history, feedlot performance, and any other suitable information. Main facility 105 also contains a server 107. Server 107 may be any server suitable for transmitting and receiving data over communication network 120. The server may provide one or more web pages to client computers using one or more suitable protocols (e.g., HyperText Transfer Protocol (HTTP) and Transmission Control Protocol/Internet Protocol (TCP/IP)). The pages may be defined using any suitable programming language (e.g., HyperText Markup Language (HTML), Dynamic HyperText Markup Language (DHTML), Extensible Markup Language (XML), etc.). The pages may include scripts, computer code, or subsets of computer code that define mini-programs (e.g., Perl scripts, Java applets, etc.). The servers may also run a database engine suitable for maintaining a database of consumer, transaction, offer, incentive, and fee information, such as Microsoft SQL Server, Oracle 8i, or any other suitable database engine. In practice, one or more functions of server 107 may be distributed across multiple servers, or may be integrated into a single server.

Although database 109 is primarily described as a central database, database 109 may be any suitable facility of obtaining data. Database 109 may be one or more local databases that provide the data to a central database. Database 109 may be a single database even if all the information in the database is distributed.

Information from database 109 may be transmitted to a certification system 160, a tracking system 145, a compliance enforcement system 155, an adaptive reasoning system 140, a sorting system 130, a genetics improvement system 180, an environmental management system 150, an adaptive logistics system 135, a supply and demand management system 170, an electronic commerce system 190, an integrated risk management system 125, a consumer value system 195, any other suitable systems, or any suitable combination thereof, via link 115.

Link 115 may include any transmission medium suitable for communicating data to and from communication network 120. Link 115 may include, for example, a dial-up telephone line, a computer network, an Internet link, an infrared link, a radio frequency link, a wireless link, a satellite link, a digital subscriber line link (e.g., a DSL link), a cable TV link, a Data Over Cable Service Interface Specification (DOCSIS) link, or any other suitable transmission link, or suitable combination of such links. Different links may be of different types depending on, for example, the particular type of access device or server used.

Any protocol or protocol stack suitable for supporting communications between client computers 110 and server 107 may be used. For example, Ethernet, Token Group, Fiber Distributed Data Interface (FDDI), Circuit-Switched Cellular (CSC), Cellular Digital Packet Data (CDPD), RAM mobile data, Global System for Mobile communications (GSM), time division multiple access (TDMA), code division multiple access (CDMA), wireless application protocol (WAP), serial line Internet protocol (SLIP), point to point protocol (PPP), Transmission Control Protocol/Internet Protocol (TCP/IP), Sequenced Packet Exchange and Internetwork Packet Exchange (SPX/FPX) protocols, or any other suitable protocol or combination of protocols may be used.

Any suitable communication network 120 may be used in the communication system in accordance with the present invention. For example, communication network 120 may be comprised in whole or in part of the Internet, an intranet, a public data network, a private data network, a wireless network, a cable network, or any other suitable data network or combination of networks.

The system may be implemented using application software that runs primarily on client computer 110, server 107, or any suitable combination thereof. However, regardless of the type of system architecture or platform used, the application software that supports the livestock management features described herein may be referred to as the system.

In a computer-based system, the user may access the system by browsing to an Internet Web site or a site on a private network. In another embodiment, system based on cellular telephones or the like may be launched by selecting an appropriate on-screen menu option presented on the display of the cellular telephone.

For purposes of brevity and clarity, and not by way of limitation, the system is primarily described herein in conjunction with the use of a computer-based system. It will be understood that this is merely an illustrative embodiment of the present invention, and that any other suitable device or combination of devices may be used.

For purposes of brevity and clarity, and not by way of limitation, the present invention is primarily described herein as using the system to perform all of the functions of the present invention.

The system may provide a user with an interface having suitable displays that may be used by the user to benefit from the features of the livestock management system. For example, the system may provide the user with the ability to access lists of available information.

Figure 2:
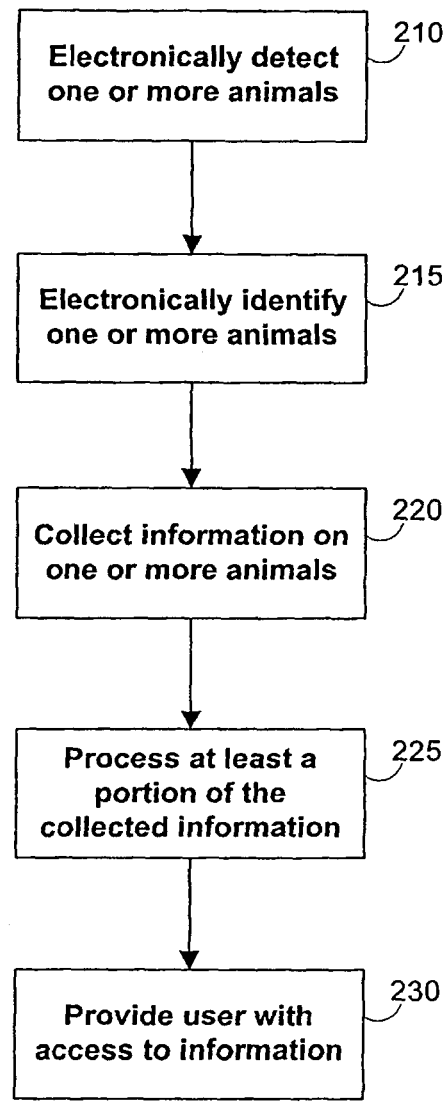
FIG. 2 is a generalized of illustrative steps for providing users with features relating to livestock management, in accordance with the present invention.

FIG. 2 shows a generalized flowchart of illustrative steps involved in providing features for livestock management. At step 210, the system may electronically detect one or more animals. For example, the system may detect multiple animals using RFID tags or any other suitable animal identification approach. In response to detecting one or more animals, the system may electronically identify the one or more animals at step 215. At step 220, the system may collect information on the one or more animals. The system may store the collected information in a database. In some embodiments, the system may automatically collect information based at least in part on the detection of the one or more animals. At step 225, the system may process at least a portion of the collected information. At step 230, the system may provide the user with access to the collected and processed information. For example, the system may provide a user that has purchased an animal with access to information relating to the animal.

Certification system 160, tracking system 145, compliance enforcement system 155, data transactions system 165, adaptive reasoning system 140, sorting system 130, genetic improvement system 180, environmental management system 150, adaptive logistics system 135, supply and demand management system 170, electronic commerce system 190, integrated risk management system 125, and consumer value system 195 may be any computer-based system and may run a database engine suitable for maintaining a database of information such as, Microsoft SQL Server, Oracle 8i, or any other suitable database engine. These systems are shown as being connected to server 1076 via communication network 120. However, the features of these systems may be provided using a single server, distributed across multiple servers, or integrated into server 107. Any other suitable approach may also be used.

Certification System

In order for users, such as the members of the livestock production chain, to lower production costs, create incremental value, and track animal performance, livestock must be differentiated. With the advent of electronic identification tags, the Internet, and other new technologies, animals may be differentiated by, for example, collecting and sharing certification information using certification system 180. Certification system 180 may be standalone or may be included as part of the system. Any other suitable approach may also be used.

Figure 5:
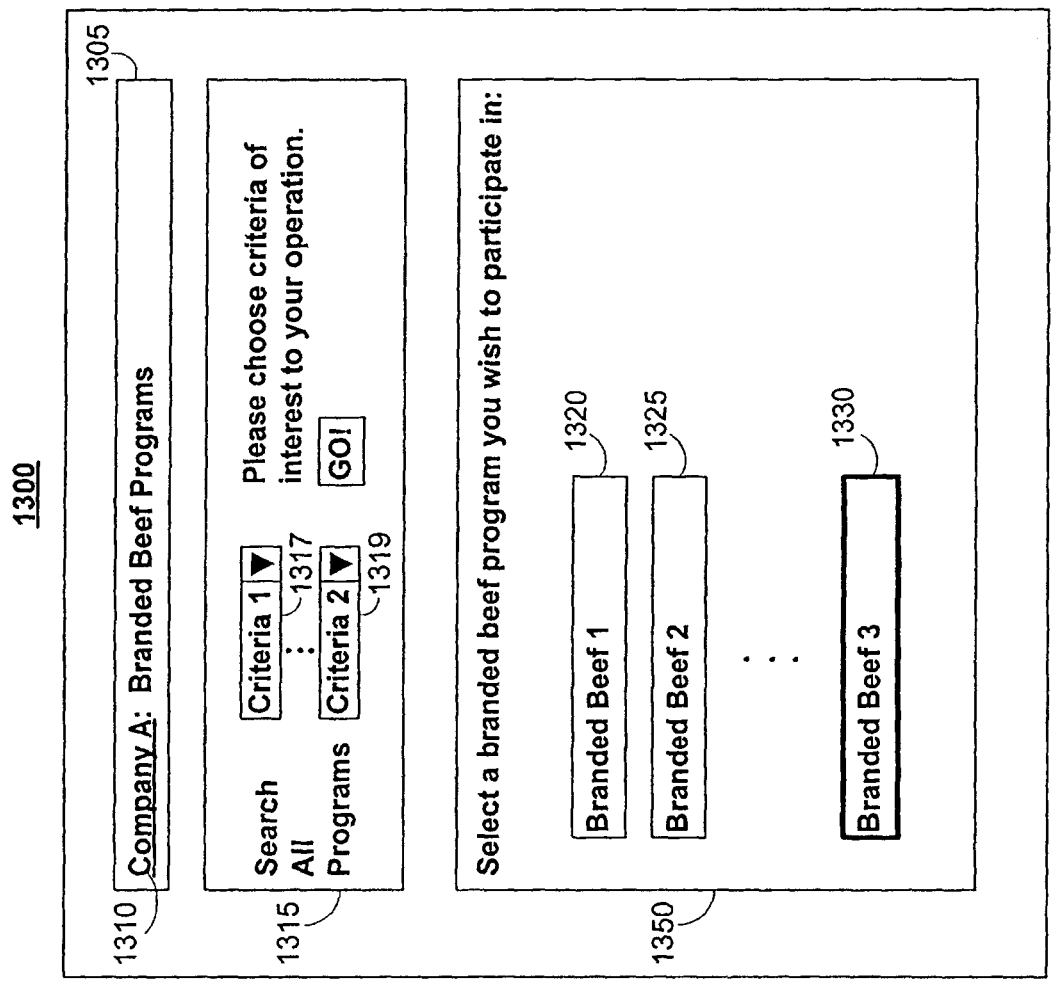

In the examples of FIGS. 5-7, certification system 180 is provided through a series of interactive web pages. Although the present invention is described primarily in the context of user interfaces on web pages, user interfaces may be part of any other suitable application. For example, user interfaces may be provided with certification software. In another example, user interfaces may be accessed over the Internet. Any other suitable approach may also be used.

Certification system 180 may be used to differentiate livestock. Certification system 180 may require users to collect information in order to participate in a beef marketing program, wherein the beef marketing program may include a branded beef program, a marketing program, or any other suitable program. These programs may require that the animals are produced and processed according to specific requirements for health (e.g., immunity building, health improvement, etc.), management, genetics, and nutrition. Such program requirements may aid in producing animals with above average growth rates, more consistent carcass quality (e.g., Choice), and/or improved yield grade. Participation in a beef marketing program may substantially improve the overall revenue potential of the animals. In some embodiments, certification system 180 may assist such programs with the data collection, verification, analysis, feedback, and/or dissemination of information via the Internet. In some embodiments, certification system 180 may assist a user (e.g., a producer or feedlot manager) with evaluating the requirements of one or more beef marketing programs and selecting the program most appropriate for his or her operation.

The information collected by certification system 180 may provide users (e.g., buyers) with insight into an animal's health immunity, genetics, history, growth potential, and/or future carcass performance. Users may pay a fee for this information and may prefer to purchase certified livestock. Typically, buyers may pay more for certified livestock, and hence certification system 180 may increase the overall value of these animals. In some embodiments, certification system 180 may provide the seller with broader market coverage for the seller's livestock because of industry-wide recognition of beef marketing programs, their promotions, and sponsorships of special Internet auctions of these certified animals.

Figure 3:
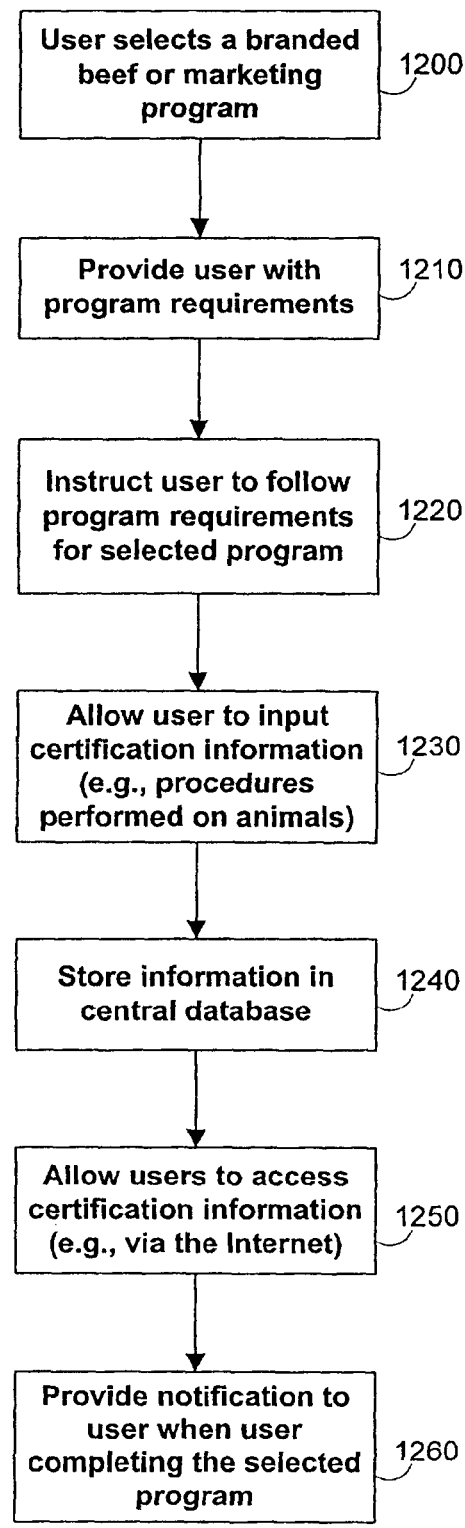
FIG. 3 is a flowchart of illustrative steps involved in certifying animals for a branded beef or a marketing program using the certification system, in accordance with the present invention.
Figure 4:
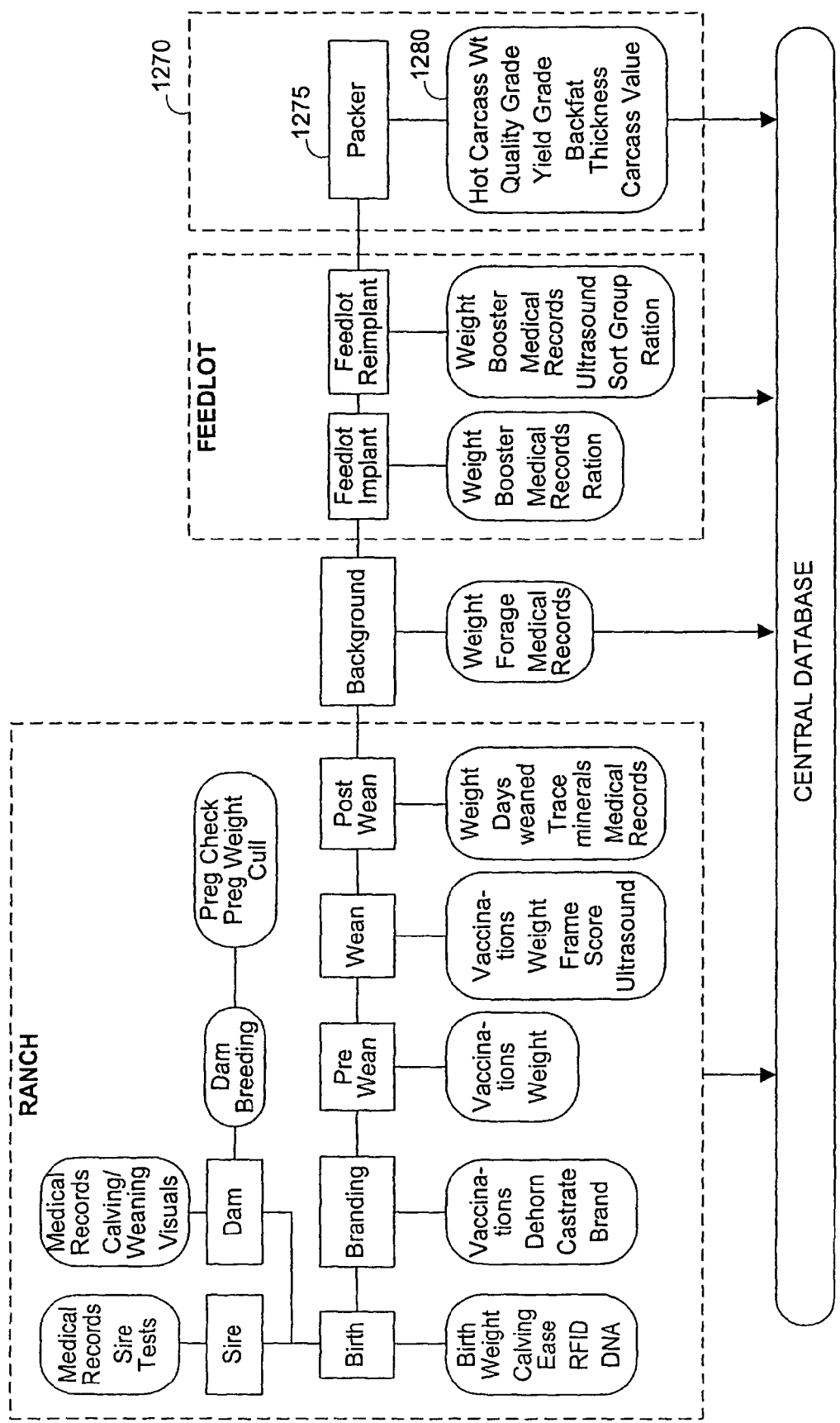
FIG. 4 is an illustrative block diagram of certification information collected at various locations, in accordance with the present invention.

FIG. 3 is an illustrative flowchart of steps involved in certifying animals for a branded beef or a marketing program. At step 1200, the user may be provided with an opportunity to participate in a beef marketing program by selecting the beef marketing program on a certification display. The user may select at least one beef marketing program. When the user selects a program, the user may be presented with program requirements at step 1210. Multiple program requirements may be presented to the user as a list. These program requirements may include rules for health, management, nutrition, and/or any other suitable rules. At step 1220, users may be instructed on how to meet the program requirements. This may require documenting procedures performed on the animals from birth to slaughter (step 1230). Such procedures may include medical treatments, weight or other physical attribute measurements, vaccinations, or any other suitable procedures. An example of the type of data, procedures, and information that may be recorded during a calf's life by certification system 180 is shown in FIG. 4. As shown in area 1270, packer 1275 may collect certification information 1280, which may include hot carcass weight, quality grade, yield grade, backfat thickness, and carcass value. When packer 1275 collects certification information 1280, packer 1275 may transmit information 1280 to the central database.

Referring back to FIG. 3, at step 1240, the documented procedures may be stored (e.g., uploaded) in the central database. At step 1250, users may access all of the certification information available on a group of animals or an individual animal via the Internet. For example, a beef marketing program may query the central database to verify that one or more animals came from a specific ranch, were finished at a specific feedlot, and were processed at the program's packing plant. That is, a user may query the database to verify that multiple animals are certifiable under one or more beef marketing programs.

In some embodiments, users may receive a notification indicating that the user has met all the requirements of the branded beef program (step 1260). The notification may also include the status of each program requirement. Notifications may be provided electronically, as for example, e-mail, pop-up messages, or other suitable electronic messages, or as printed certificates, that are delivered to the users. Notifications may also qualify the value of recommended procedures and treatments through valuation of a seller's costs and a buyer's benefits. The seller's costs may include vaccinations, labor, feed, calf morbidity and mortality during weaning, market price volatility, etc. The buyer's benefits may include reduction in calf morbidity and mortality rates, weight gain performance, conversion efficiency, carcass performance, medicine, veterinary charges, labor, etc. Such information may be used to determine a fair market value for certified animals and may provide data to other programs or applications (e.g., sorting system 130, tracking system 145, etc.) within the system.

Certification system 180 is merely illustrative of the principles of this invention. Those skilled in the art may make modifications without departing form the scope and spirit of the invention.

FIG. 5 shows an illustrative display 1300, such as a web page, for providing a user with an opportunity to select a branded beef and/or marketing program. Illustrative display 1300, as well as other displays described herein, may include header portion 1305. Header portion 1305 may include, for example, the name of the system provider (e.g., Company A), a description of the display, and link 1310. Link 1310 may provide a user with opportunities to access information about the system or access any other suitable information. Link 1310 may include any suitable passive or interactive text, graphics, video, audio, animation, and/or any other suitable content. Illustrative display 1300 may provide the user with opportunities to select the appropriate branded beef program by inputting criteria (e.g., filter 1317, filter 1319, etc.). Users may, for example, select criteria using searching interface 1315.

Display 1300 may provide program menu 1350 listing one or more of the branded beef programs offered by Company A. Program menu 1350 includes program indicators (e.g., indicator 1320, indicator 1325, indicator 1330, etc.) for one or more of the branded beef programs offered by Company A. Program indicators may include any suitable passive or interactive text, graphics, video, audio, animations, a combination thereof, and/or any other suitable content. In this example, the user indicates a desire to participate in "Branded Beef 3" by selecting indicator 1330. Upon selecting indicator 1330, the user may be directed to illustrative display 1400. FIG. 6 shows an illustrative display 1400 for the program requirements the user must follow for the user's animal to be certified by "Branded Beef 3." Display 1400 may include checklists, check boxes, lists, forms, or any other suitable on-screen elements.

The user may receive a notification upon completion of the program requirements and upon verification of the user's actions. An illustrative notification is shown in FIG. 7. A notification 1500 may include a message to the user and a valuation or rating of the user's animal. For example, the valuation may be in terms of the user's costs, buyer's benefits, and comparisons relative to other participants in the program on an average basis either at a local, state, or national level.

Certification system 130 is merely illustrative of the principles of this invention and various modifications may be made by those skilled in the art without departing from the scope and spirit of the invention.

Tracking System

Using certification system 130, users may differentiate animals. Some embodiments may use the certification information or any other suitable information stored in the central database to aid in tracking animals. The system may provide, for example, tracking system 145 that uses information to assist in monitoring the growth and performance of each animal. Tracking system 145 may be standalone or may be included as part of the system. Any other suitable approach may also be used.

Tracking system 145 may monitor the growth and performance of each animal from conception to harvest. Tracking system 145 may require users (e.g., owners of animals) to document, for example, all processes and treatments performed, medical history, average daily weight gain in different environments. Buyers desiring to purchase animals through branded beef programs or other marketing programs may use the tracking information to verify the source and/or condition of the animals. Since the ownership of the animal may change several times throughout its life, each user (e.g., stakeholder) in the supply chain may be required to acquire relevant data and enter the data into the central database. For example, tracking system 145 may generate a medical record in a database documenting the diagnosis of any illness and specific medication dispensed any time an animal becomes sick. Each user in the supply chain may access the central database through applications programs and data acquisition systems, such as compliance programs, certification programs, adaptive reasoning programs, adaptive logistics programs, and other applications within the livestock management system. In an alternate embodiment, when a buyer purchases one or more animals, tracking system 145 may provide the buyer with tracking information in the central database relating to the purchased animals.

Figure 8:
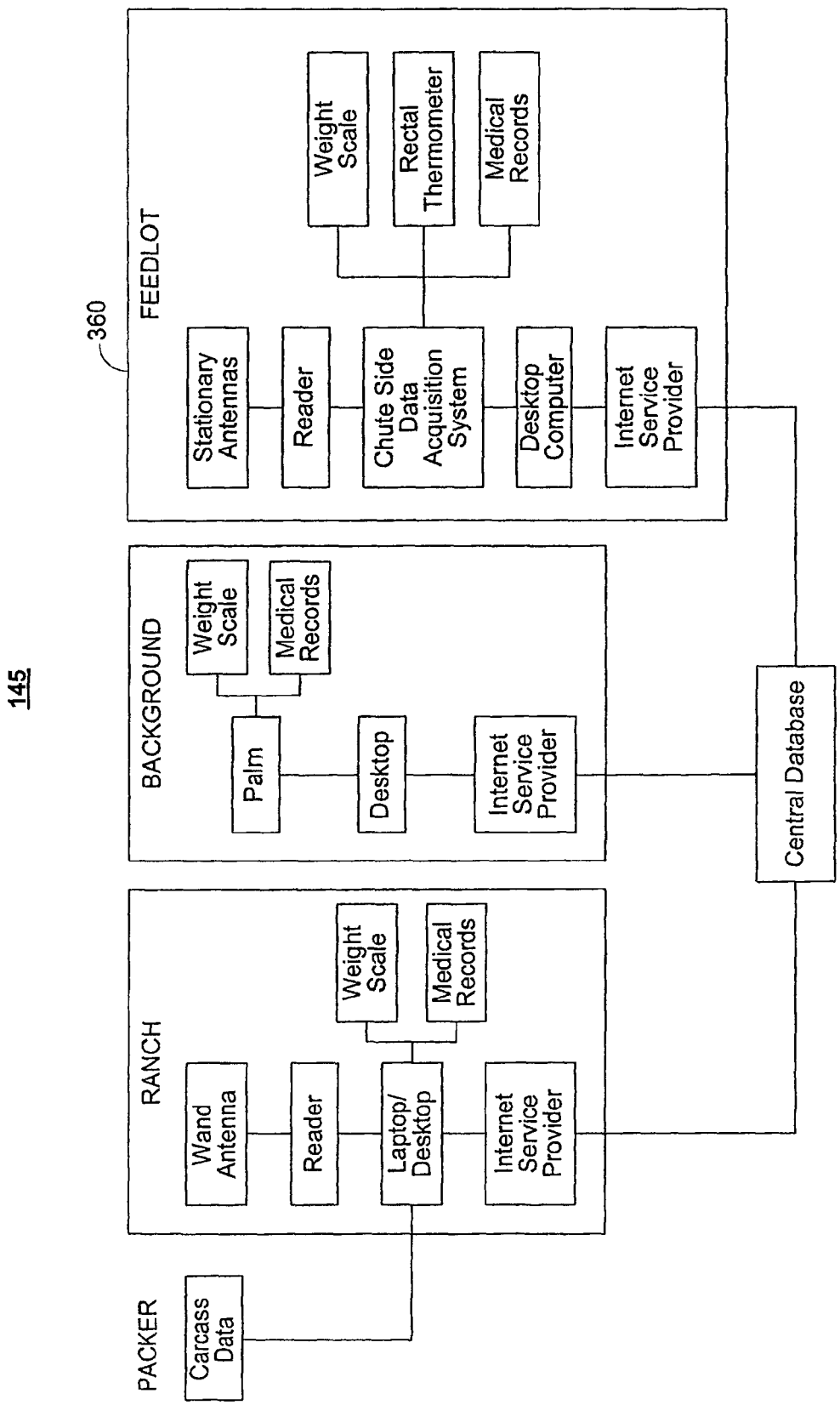
FIG. 8 shows illustrative arrangements for the equipment and devices used to obtain tracking information, in accordance with the present invention.

One example of multiple embodiments of tracking system is shown in FIG. 8. As shown, tracking system 145 may consist of multiple devices unique to its own environment. At feedlot 360, tracking system 145 may consist of a stationary antenna, a radio frequency reader, a chute-side data acquisition system, a global positioning satellite receiver, and a desktop computer that may connect to the central database via the Internet. Multiple devices, such as a weight scale, a rectal thermometer, or any other suitable device may be connected to tracking system 145 via the chute-side data acquisition system.

Tracking system 145 may require animals to have radio frequency identification tags (hereinafter referred to as "RFID tags"). The degree of automation of tracking system 145 may depend on the size and sophistication of each user's operation. For example, a smaller operation (e.g., ranch, background, etc.) may desire the least amount of instrumentation and automation. In another embodiment, tracking system 145 may consist of a handheld computer and a desktop computer, which may connect to the central database via the Internet. The handheld computer may connect to multiple devices, such as a weight scale or any other suitable devices. In these embodiments, tracking information may be entered manually or may be entered automatically into the tracking system. Tracking information, such as medical records, may be uploaded to the central database.

Figure 9:
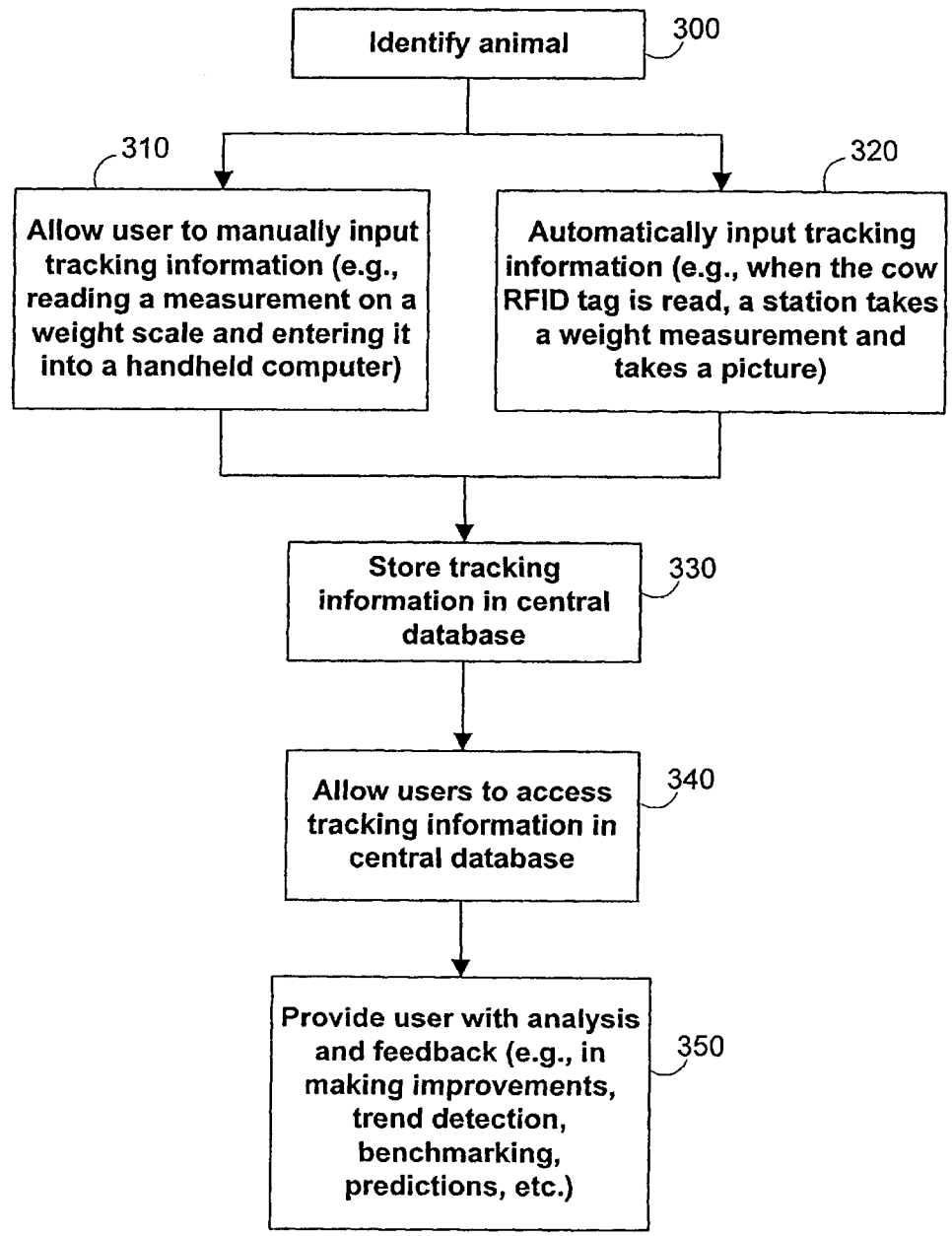
FIG. 9 is a flowchart of illustrative steps involved in monitoring and verifying animals using the tracking system, in accordance with the present invention.

FIG. 9 is an illustrative flowchart of steps involved in monitoring and verifying animals using tracking system 145 in accordance with the present invention. Animals may have RFID tags, barcode tags, or other identification tags attached to their ear or any other suitable location. At step 300, when animal walks or runs by a station, the animal may be identified by, for example, using a radio frequency reader to read the animal's tag. However, any other suitable approach may be used. After identifying the animal, the station may execute a plurality of devices and/or applications to obtain tracking information from the animal. For example, the station may capture a static or dynamic image of the animal with a digital camera or any other suitable image-capturing device. The station may also use rectal thermometers and weight scales for temperature and weight measurements. The station may be used to collect tracking information, such as weight, temperature, color, location, etc. Tracking information may be manually or automatically entered depending on, for example, the size and sophistication of the user's operation. At step 310, tracking system 145 may provide the user (e.g., a rancher) with an opportunity to manually input tracking information. In another suitable approach, tracking system 145 may automatically enter the tracking information at step 320. At step 330, tracking system 145 may periodically (e.g., a time predetermined by tracking system 145 and/or the user) store the tracking information acquired on animals in the central database. When the tracking information acquired is deemed incomplete, the central database may generate an electronic (e.g., an e-mail, pop-up, or any other electronic message) or printed notification and send it to the user. Tracking system 145 may allow the user to access tracking information from the central database, tracking system 145, or any other suitable system.

Tracking system 145 may promote sharing of information building of relationships between users (e.g., buyers and sellers) in the supply chain. At step 340, the tracking information stored in the central database may be available to one or more users in the supply chain. Tracking system 145 may also aid in benchmarking and predicting future trends. For example, tracking system 145 may provide tracking information to adaptive reasoning system 140, adaptive logistics system 135, and other applications within the livestock management system.

At step 350, tracking system 145 may also analyze the tracking information and feedback from other users in the supply chain to assist a user in making improvements in his or her operation, quality, and overall profitability. Additionally, tracking system 145 may track animals from conception to consumption. This may inherently provide a safer method and mechanism for tracking the supply of meat.

Tracking system 145 is merely illustrative of the principles of this invention and various modifications may be made by those skilled in the art without departing from the scope and spirit of the invention.

Compliance Enforcement System

Certification system 180, tracking system 145, and other systems may store their respective data into the central database. The system may provide a method for enforcing compliance that uses the information stored in the central database. The system may provide, for example, compliance enforcement system 155 that looks to corroborate the information in the central database. Compliance system 180 may be standalone or may be included as part of the system. Any other suitable approach may also be used.

Compliance enforcement system 155 may be used to ensure that a user (e.g., sellers, ranchers, stocker operators, backgrounders, feedlot managers, etc.) is following specific requirements for a livestock program. For example, a branded beef program may not allow the use of hormone growth promoters, antibiotics, certain genetics and/or animal proteins in the feed. Compliance enforcement system 155 may use information acquired from one or more sources to ensure compliance by the user. For example, compliance enforcement system 155 may obtain tracking information from tracking system 145 and certification information from certification system 160.

Using the Internet or the central database, users may selectively share and compare compliance information with buyers. Compliance information such as medical records, process records, nutrition records, genetic test results and any other suitable information may be shared to determine whether a user has complied with the buyer's requirements. Compliance enforcement system 155 may rely on feedback mechanisms and facilitation from veterinarians, nutritionists, animal science professionals, and/or any other suitable experts. Experts may be used to monitor for compliance and provide feedback and advice to sellers for improving compliance and livestock quality.

In an alternate embodiment, an authorized user may inspect an animal for compliance. Authorized users may include beef marketing representatives, authorized personnel, or any other suitable user. Compliance enforcement system 155 may provide the authorized user with access to information in the central database, review records, and inspect the animal, thereby ensuring compliance with the branded beef program or beef marketing program.

In some embodiments, compliance enforcement system 155 may monitor communications from multiple computers concerning an individual animal. For example, compliance enforcement system 155 may monitor a communication (e.g., an e-mail, a data entry, etc.). Compliance enforcement system 155 may compare that communication with compliance enforcement criteria stored in the central database. In some embodiments, compliance enforcement system 155 may verify that an individual animal complies with the program requirements of, for example, a beef marketing program based on the comparison.

Figure 10:
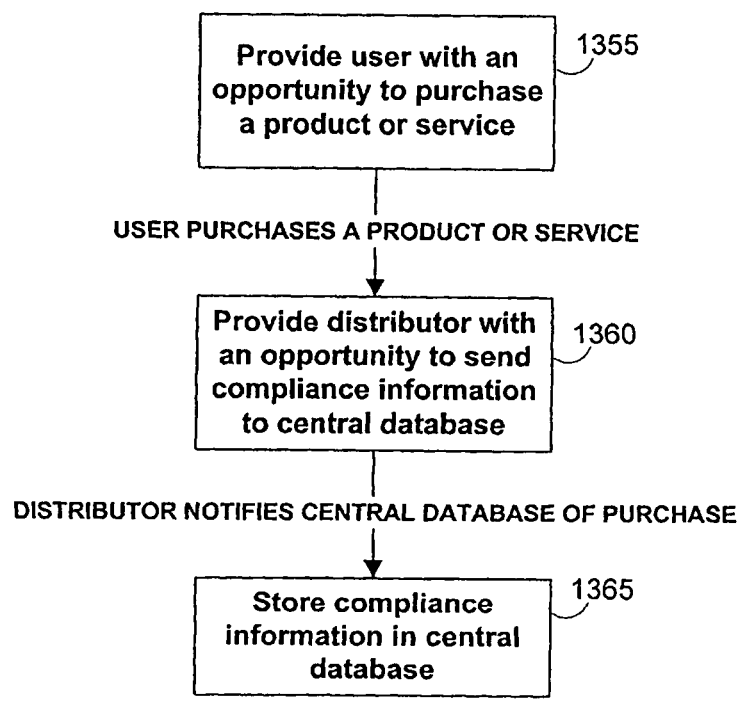
FIGS. 10-12 are flowcharts of illustrative steps involved in enforcing compliance using the compliance enforcement system, in accordance with the present invention.

FIG. 10 is a flowchart of illustrative steps involved in enforcing compliance in the livestock management system. At step 1355, the user may purchase a product or service, such as a vaccine from a veterinarian, a distributor, an Internet marketplace, or any other suitable distributor. At step 1360, compliance enforcement system 155 may detect when a product or service is used on an animal. For example, when a user purchases a product or service from a distributor, the distributor (e.g., veterinarian or any other suitable expert) may send a message to the central database at step 1360. The entry of the purchase in the central database may indirectly confirm participation in a preconditioning program where that product or service (e.g., vaccine) is a prerequisite. Compliance may also be determined by correlating or comparing the purchases of specific vaccines or other purchased products or services over the Internet to multiple requirements of a beef marketing or other marketing program that the user desires to market their animals through. At step 1365, the compliance information from the distributor may be stored in the central database.

Figure 11:
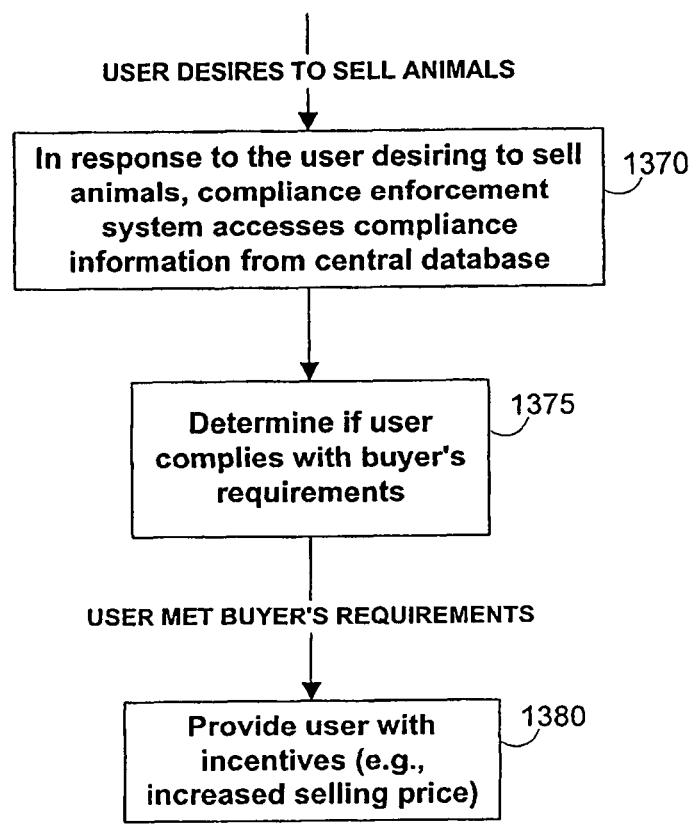

FIG. 11 is a flowchart of illustrative steps involved in providing users with incentives upon selling their animals. When the user desires to sell his livestock, compliance information may be accessed from the central database at step 1370. Compliance information may include medical records, process records, nutrition records, source, genetic test results, and any other suitable data. Compliance enforcement system 155 may determine whether the user has complied with the buyer's requirements at step 1375. For example, for a user to receive Angus beef certification the cow must undergo specific preconditioning programs and other requirements. To determine whether the user has met the buyer's requirements, the central database may be queried to determine if the user has met the buyer's program requirements. The compliance information may be subjected to a compliance screen or checklist. An illustrative compliance screen 1399 is shown in FIG. 13. Compliance screen 1399 may include a summary of the user's actions and an analysis of the user's actions.

When the user meets the buyer's requirements, the user may be entitled to incentives at step 1380. Incentives may include financial rewards and/or financial premiums commensurate to quality requirements. These incentives may also include reimbursement for the costs incurred for following the buyer's requirements or discounts on offered products, etc.

Figure 12:
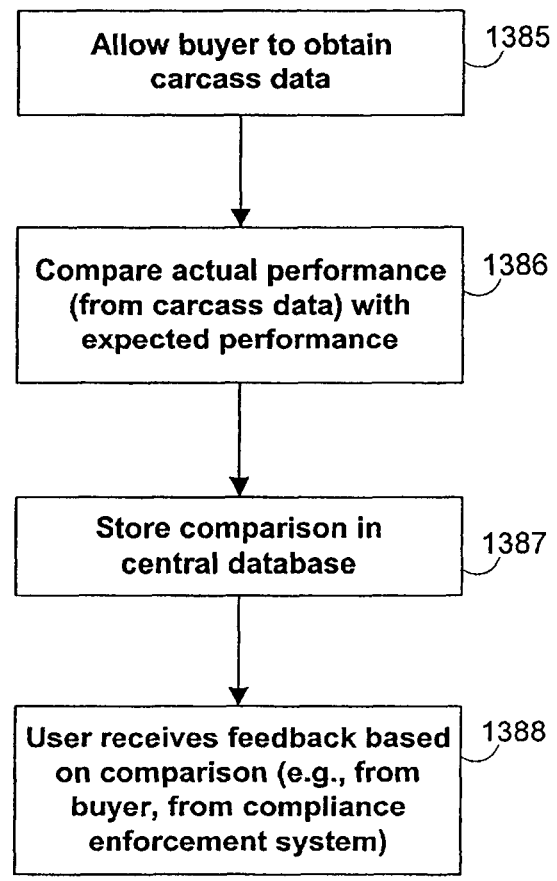

Compliance enforcement system 155 may also be used for verifying the performance of the user. FIG. 12 is a flowchart of illustrative steps involved in provide feedback to the user from the buyer. For example, carcass quality may be the endpoint criterion for the buyer. By obtaining carcass data, the feedback may be based on, for example, a comparison of the expected performance of the animal to the actual performance. At step 1385, the buyer may obtain the livestock and pay a packer for the carcass data. At step 1386, the buyer may compare the actual performance of the animal (e.g., from the carcass data) to the expected performance of the animal. The comparison may by stored in the central database at step 1387. At step 1388, the user may receive feedback from one or more buyers based on the comparison.

Based on the feedback from one or more buyers, the user may receive a compliance rating. The compliance rating may be a quality score for the user in the supply chain on a per order basis. The score may aid in identifying the user's shortcomings and initiate the necessary corrective actions to improve the quality of the livestock. Compliance enforcement system 155 may also set a minimum rating that must be met by any user participating in the buyer's program.

Veterinarians may be involved with the treatment of calves and the sale and distribution of vaccines and medicine. Some embodiments may be used to monitor the performance of the veterinarian. The actions of the veterinarian may be recorded in the central database. When one or more users associated with a veterinarian performs consistently below a program's accepted standards, the veterinarian may be placed on probation and at a time predetermined by compliance enforcement system 155, the veterinarian may be excluded from participation in the buyer's program.

Compliance enforcement system 155 is merely illustrative of the principles of this invention and various modifications may be made by those skilled in the art without departing from the scope and spirit of the invention.

Data Transactions System

As the central database accumulates information through automatic or manual collection processes, the system may determine the accessibility of such information. The system may categorize the information into groups, such as privileged and private.

Privileged information may, for example, include data that may be transferred to a user that purchases the animal, such as breed, sex, weight, vaccination information, or any other suitable privileged information. Veterinarians, consultants, or other service providers may also access such privileged information.

In some embodiments, data transactions system 165 may allow a user to store private information. In some embodiments, data transactions system 165 may provide access to private information to a user that has entered the private information. Private information may include, for example, origin, location, pen number, lending officer, inspection location, and any other suitable information that may reveal the ownership of the animal.

In some embodiments, data transactions system 165 may differentiate information into such groups as privileged and private to share information to other users of the supply chain. Data transactions system 165 may also differentiate information to protect the identity of the owner.

Figure 14:
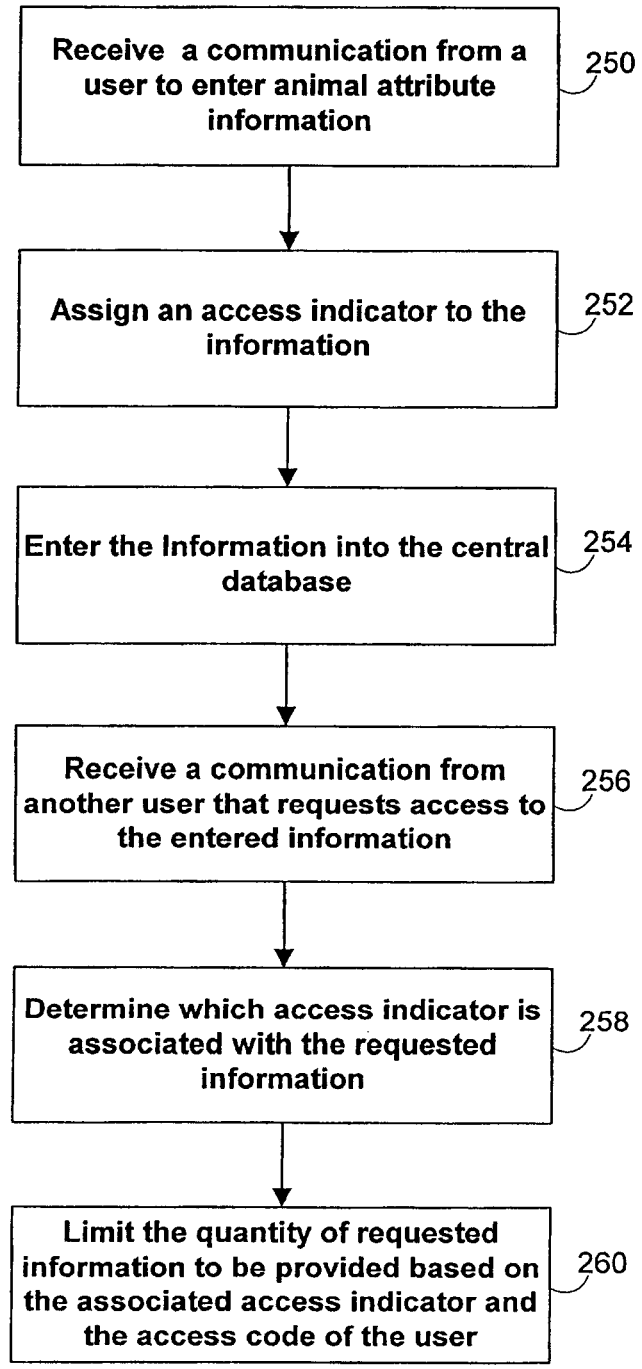
FIG. 14 is a flowchart of illustrative steps involved in ensuring the communication of information using the data transactions system, in accordance with the present invention.

FIG. 14 is a flowchart of illustrative steps for providing users with access to information. At step 250, data transactions system 165 may receive a communication from a user. The communication may be a request to enter animal attribute information into the central database. In response to the communication, data transactions system 165 may assign an access indicator to the animal attribute information (step 252). Data transactions system 165 may enter the information into the central database (step 254). In some embodiments, data transactions system 165 may assign an access indicator to the animal attribute information before the information is entered into the central database. In some embodiments, data transactions system 165 may search through the central database for entered animal attribute information without an assigned access indicator. Upon locating an entered animal attribute in the central database without an access indicator, data transactions system 165 may assign an access indicator to the entered information.

In some embodiments, data transactions system 165 may sort the entered information into categories, such as privileged and private. However, data transactions system 165 may categorize the information into any other suitable group.

At step 256, data transactions system 165 may receive a communication from another user that requests access to the entered information. In some embodiments, each user may have an access code. Such an access code may include user information (e.g., name, address, type of user, etc.). Upon receiving the communication, data transactions system 165 may determine which access indicator is associated with the requested information (step 258). At step 260, data transactions system 165 may limit the quantity of requested information to be provided to the user based on the associated access indicator and the access code of the user.

For example, if a user has purchased an animal, data transactions system 165 may provide the user with access to privileged information on the animal. Privileged information may include, for example, vaccination information, medical history, weight history, etc. In another example, if a user has entered information on an animal, the system may provide the user with access to the information that the user has inputted (e.g., private information). In response to determining the status of the user, data transactions system 165 may provide the user with access to the appropriate information.

In some embodiments, data transactions system 165 may provide users that have entered information for a particular animal (e.g., an animal with an RFID) with access to privileged information (e.g., information inputted by other users) and private information (e.g., information that the user has inputted). In some embodiments, data transactions system 165 may provide users that have purchased an animal with privileged information.

In some embodiments, data transactions system 165 may provide users with an opportunity to log in. In some embodiments, users may be required to log in by, for example, entering a user name and password. In other embodiments, users may not be required to log in to access the features of the system. In approaches where users log in, data transactions system 165 may use the log in information to retrieve the user's status and accessibility during the data transaction process. Data transactions system 165 may use user names (e.g., CiN numbers or any other suitable identification) to allow data service providers, veterinarians, organizations, and other affiliated data entry personnel to input data without compromising the security of the animal owner.

In some embodiments, data transactions system 165 may provide users with a notification feature. When the user requests to input information, data transactions system 165 may use a "first-in-first-out" approach to enter inputted information into the central database. Data transactions system 165 may detect when information that the user has inputted has been entered into the central database. In response to the detection, data transactions system 165 may provide the user with a notification notifying the user of that the information has been entered into the database. For example, data transactions system 165 may automatically send a printed or electronic (e.g., an e-mail, pop-up message, etc.) notification.

In some embodiments, data transactions system 165 may allow the user to select particular information to be delivered to other users, such as buyers, veterinarians, organization, or any other suitable user. For example, data transactions system 165 may automatically send a printed or electronic (e.g., an e-mail, pop-up message, etc.) notification.

Data transactions system 165 is merely illustrative of the principles of this invention and various modifications may be made by those skilled in the art without departing from the scope and spirit of the invention.

Adaptive Reasoning System

As the central database accumulates the information, the system may be adaptive and may have learning capabilities. Specific health regimens and their causes and effects may be entered into, for example, adaptive reasoning system 140, which allows the system to learn and pass the information on to the users. Adaptive reasoning system 140 may simulate an array of experts overlooking an operation. Adaptive reasoning system 140 may be standalone or may be included as part of the system. Any other suitable approach may also be used.

Adaptive reasoning system 140 simulates logic, rules, and/or good practices used by experts for livestock management. Adaptive reasoning system 140 may recommend actions to be taken based on criteria, such as observations, measurements, and historical information archived in the central database. The outcome of these actions may be compared with expected results and trends established. The actual outcome may be used to continuously refine, improve, and/or recalibrate analytical and empirical models. In some embodiments, adaptive reasoning system 140 may create web-enabled expert systems and/or knowledge-based tools available at, for example, ranches and feedlots and may be part of an overall livestock management system.

Adaptive reasoning system 140 may include a library of expert programs (e.g., modules). Each program may focus on a subject matter of importance to a livestock segment. For example, an expert system may be used for early detection of sickness in calves at a feedlot. The expert system may guide one or more users at the feedlot through a process of making observations, taking physical measurements, reviewing medical records, and making a correct diagnosis and selecting an appropriate treatment. For example, the expert system may use RFID tags to determine the number of times an animal has approached the feeding bunk. If an animal does not approach the feeding bunk the average number of times, adaptive reasoning system 140 may trigger a tracking device on the animal (e.g., place a flag) and notify the user. In some embodiments, adaptive reasoning system 140 at, for example, a feedlot may periodically (e.g., a time predetermined by adaptive reasoning system 140) look at the weight history and medical records of animals and may identify calves that are potential railers (i.e., calves that may not meet their potential for growth and/or performance) and may be sold at the earliest opportunity. In yet another approach, adaptive reasoning system 140 at, for example, a ranch may be used to systematically cull cows based on information stored in the database, such as calf weight gain data, dam breeding data, carcass data, and any other suitable data.

Figure 15:
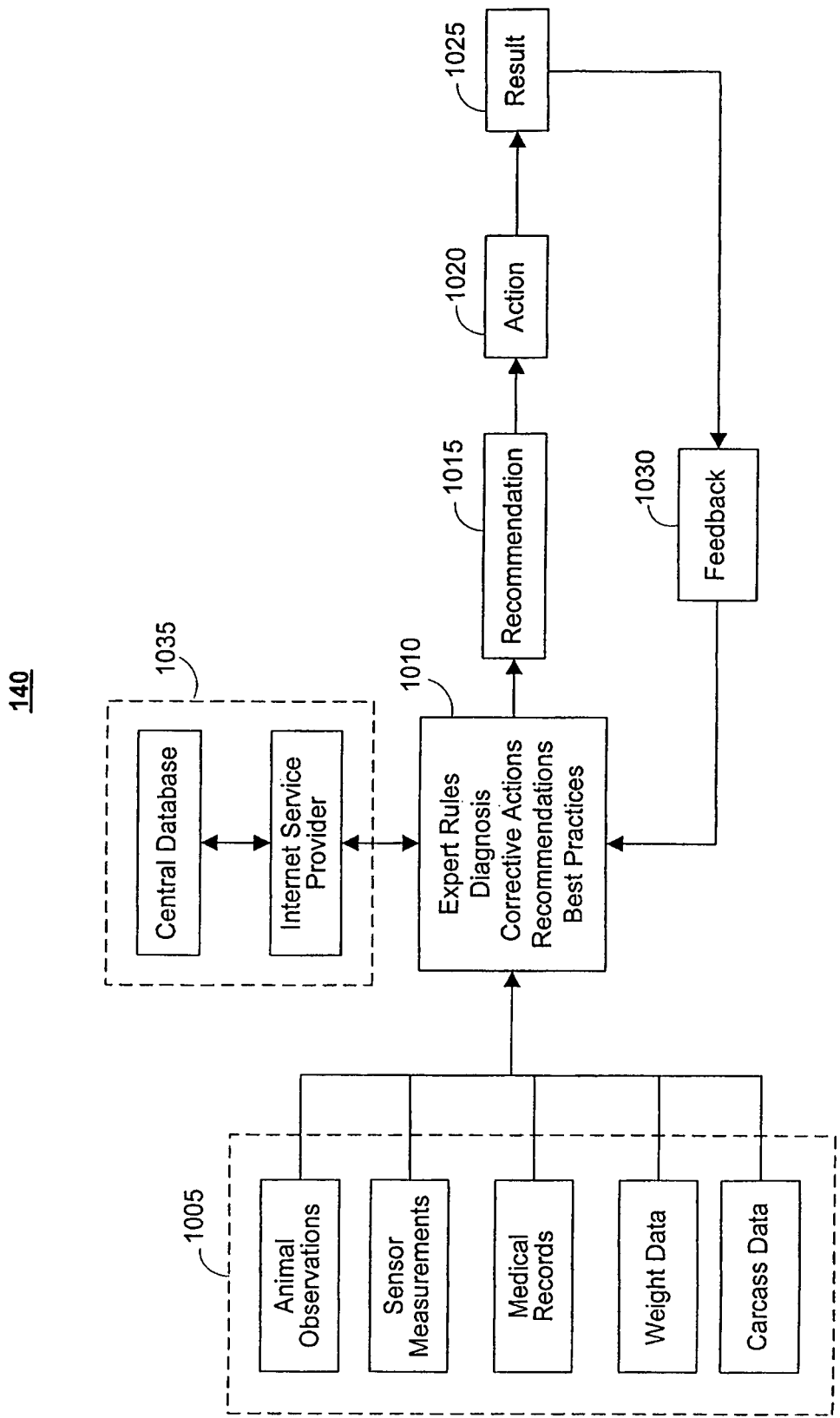
FIG. 15 shows a block flow diagram of the adaptive reasoning system, in accordance with the present invention.

FIG. 15 shows a block flow diagram of adaptive reasoning system 140 in accordance with the present invention. At step 1005, adaptive reasoning system 140 may collect adaptive reasoning information from the animal. The adaptive reasoning information may be collected using a data acquisition station or using any other suitable approach. Collecting information may be automated or may require a user to manually enter data into the database. Information may include animal observations, sensor measurements, or any other suitable information. Animal observations may refer to ocular or nasal discharges, coughing, posture, movement, feeding pattern, and social behavior. Sensor measurements may refer to monitoring a calf's RFID, core body temperature, digital images, vaginal mucous conductance, or any other parameter deemed important for an application. Information may also be obtained from the central database (e.g., stored tracking information from tracking system 145).

In some embodiments, adaptive reasoning system 140 may typically use information and data from other systems within the overall livestock management system depending on the type, size and complexity of the operation. The adaptive reasoning system may use artificial intelligence methods or models, such as neural networks, or any other suitable intelligence methods for training or, for example, for assisting in interpreting the information.

In some embodiments, adaptive reasoning system 140 may be a closed loop feedback system. The information collected at step 1005 may be analyzed by an expert system and/or a knowledge-based tool at step 1010. The user may desire to retrieve historical data from the database via the Internet at step 1015. Based on the collected information and the rules of adaptive reasoning system 140, the expert system may make one or more recommendations to the user. The rules may also include logic and good practices used by experts. The recommendations from adaptive reasoning system 140 may be reviewed by the user at step 1020. The user may assess the risks associated with the actions recommended by adaptive reasoning system 140 at step 1025.

At step 1030, the user may decide on a particular course of action based on the recommendation from adaptive reasoning system 140. Upon selecting a recommendation, adaptive reasoning system 140 may provide the user with a list of steps to perform the selected recommendation. When the user performs the recommendation, the actual outcome may be monitored and may be compared with the expected results at step 1035. The difference between the expected result and the actual result may be reconciled and used to improve the rules used by adaptive reasoning system 140 and to improve the performance of other systems within the livestock management system. Therefore, adaptive reasoning system 140 may be used to improve the management of the operation so that the overall commercial value of the livestock is improved and that the business is more efficient and profitable. Adaptive reasoning system 140 may also be used to predict futures trends based on, for example, the information in the central database and the compared results.

Adaptive reasoning system 140 is merely illustrative of the principles of this invention and various modifications may be made by those skilled in the art without departing from the scope and spirit of the invention.

Sorting System

Typically, livestock is sold by the truckload. Compliance enforcement system 155, adaptive reasoning system 140, and other systems may be used to generate additional value from livestock. In order to generate additional value, the livestock must be sorted. The system may provide, for example, sorting system 130 to aid users with sorting livestock. Sorting system 130 may obtain any suitable information from the central database (e.g., certification information, tracking information, etc.). Sorting system 130 may be standalone or may be included as part of the system. Any other suitable approach may also be used.

Sorting system 130 may sort animals so that additional value is generated. Animals may be sorted into groups based on physical attributes, process attributes, any other attributes, and/or any combinations thereof. Physical attributes may be used as indicators of growth rate and carcass performance. Physical attributes may include gender (e.g., steer, bull, heifer, etc.), breed mix (e.g., Angus, Charolais, Brahman, etc.), ear size, hip height, age, muscle, color, eye color, weight, or any other suitable physical attribute. Process attributes may identify treatments and procedures administered to the animals, which may improve animal performance and/or save time, labor, and cost to a buyer in the supply chain. Process attributes may include de-horned, castrated, weaned, bunk-broke, preconditioned as per a program such as market preferred, market plus, etc., open heifers (i.e., checked for pregnancy), DNA tested, ultrasound measurements, or any other suitable process attribute. Animals may also be sorted based on other attributes, such as source (e.g., geographic region). Sorting system 130 may allow a user to differentiate animals using one or more criteria based on physical and/or process attributes. For example, the criteria may be modified to meet the market demand or a buyer's needs (e.g., sales order requirements). A buyer may desire only calves weighing between 400 to 450 pounds, only steers, black colored, de-horned, castrated, and preconditioned to a Vac45 health program.

Figure 16:
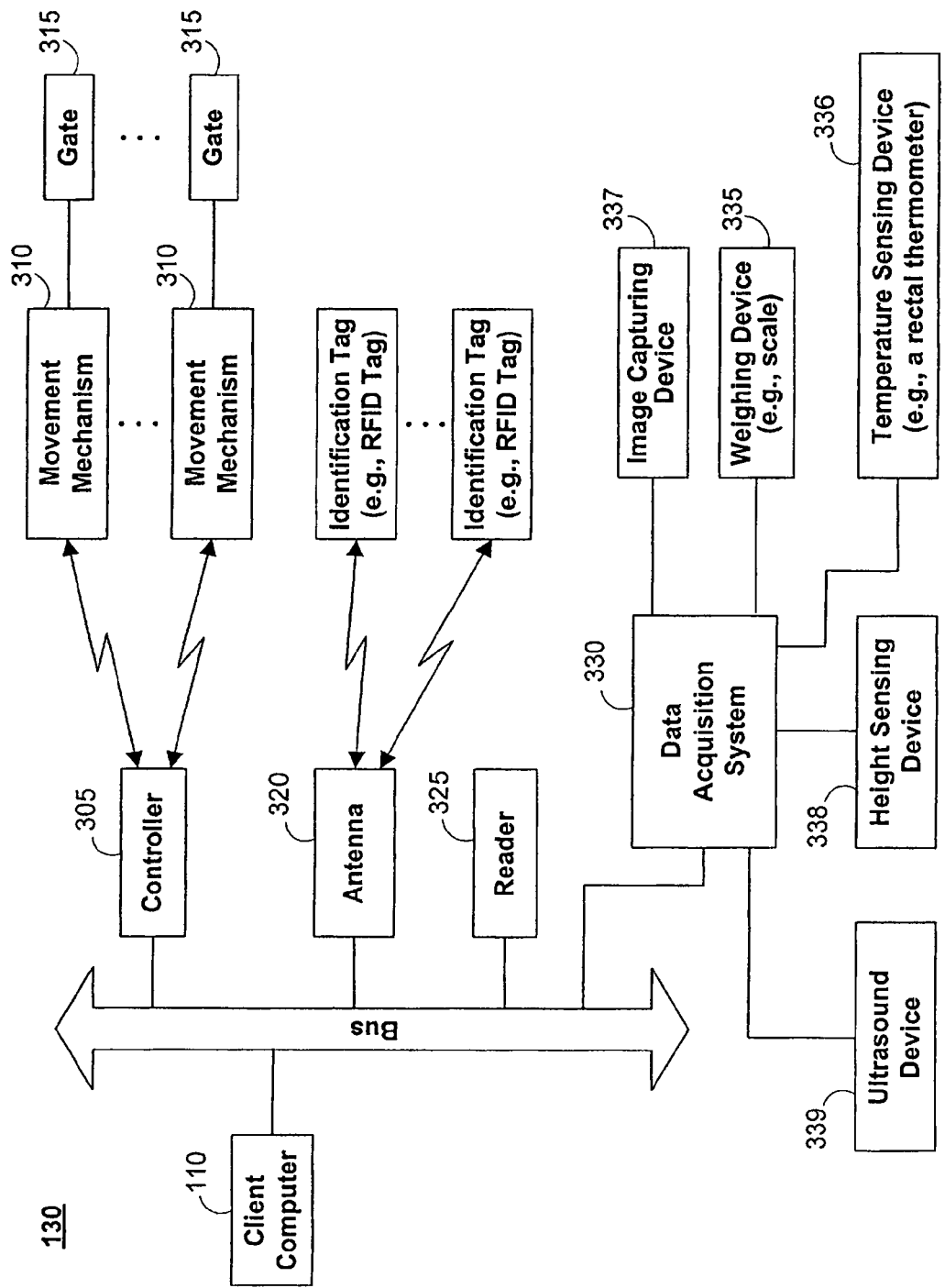
FIG. 16 illustrates an arrangement for the equipment and devices used in the sorting system, in accordance with the present invention.

Preferably, sorting is performed at assimilation sites, sale barns, feedlots, and/or any other suitable location. One embodiment of sorting system 130 implemented at an assimilation site is shown in FIG. 16. Sorting system 130 may consist of one or more devices unique to its own environment. However, the degree of automation and the types of devices may depend on the size and sophistication of each user's operation. As shown in FIG. 16, sorting system 130 may consist of an antenna 320, a reader 325 (e.g., a radio frequency reader), a controller 305, and a data acquisition system 330. Client computer 115 may connect to the central database, for example, via the Internet. Multiple devices, such as a weighing device 335 (e.g., a weight scale), a temperature sensing device 336 (e.g., a rectal thermometer), an image-capturing device 337, a height sensing device 338 (e.g., a light curtain), or an ultrasound device 339 may be connected to the data acquisition system of sorting system 130. Image-capturing device 337 may be used to sort animals by color. In another approach, image-capturing device 337 may be combined with a laser to obtain a three-dimensional image of the animal. Any other suitable sensors or devices may be connected to sorting system 130.

Sorting system 130 may physically sort animals into pens. The pens may have the capacity to hold a truckload or a any other suitable amount of animals. Client computer 115 may guide one or more animals into specific pens by instructing controller 305 to extend or retract movement mechanisms 310, which may open or close one or more gates 315. Controller 305 may control movement mechanism 310 by a person operating movement devices and equipment, client computer 115, or any other suitable approach. Movement mechanism 310 may be an electrical actuator, a hydraulic actuator, or any other suitable mechanism. Preferably, movement mechanism 310 is a low noise actuator.

Figure 17:
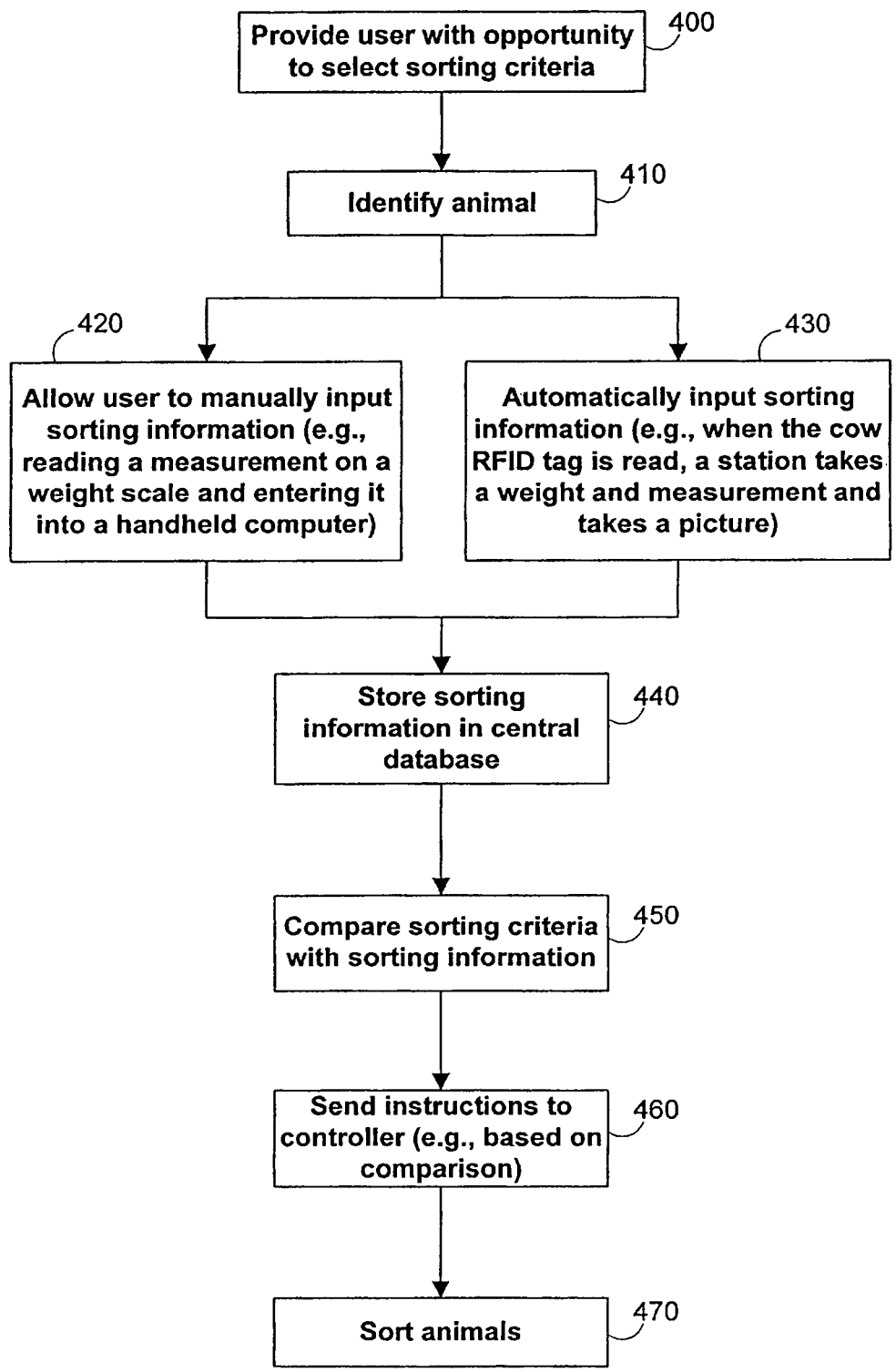
FIG. 17 is a flowchart of illustrative steps involved in sorting animals using the sorting system, in accordance with the present invention.

FIG. 17 is an illustrative flowchart of steps involved in sorting animals in accordance with the present invention. At step 400, sorting system 130 may provide a user with an opportunity to select sorting criteria (e.g., physical sorting attributes, process sorting attributes, etc.). For example, sorting system 130 may allow the user to enter sorting criteria into the central database.

Animals may have identification tags (e.g., RFID tags, barcode tags, etc.) attached to their ear or any other suitable location. At step 410, sorting system 130 may electronically detect and identify an animal. For example, when the animal walks or runs by a station, a reader may read the animal's tag or identification data may be manually entered into a computer, handheld computer, or any other suitable device. After identifying the animal, the station may execute a variety of devices and/or applications. For example, the station may capture a static or dynamic image of the animal with a digital camera or any other suitable image-capturing device. As another example, the station may use temperature sensing devices (e.g., rectal thermometers) and weight scales to obtain temperature and weight measurements. Data may be manually or automatically entered depending on, for example, the size and sophistication of the user's operation. At step 420, sorting system 130 may provide the user (e.g., a rancher) with an opportunity to manually input sorting information. In another suitable approach, sorting system 130 may automatically enter the sorting information at step 430. For example, as each device obtains data, sorting system 130 may create a record, such as a medical record, or a process record, and record the newly obtained information.

At step 440, upon collecting the sorting information on the animal, sorting system 130 may store the sorting information in the central database. Sorting information may be saved in the central database such that one or more users (e.g., ranchers, interested parties, etc.) may access the information. For example, when a user purchases an animal, sorting system 130 may provide the user with access to sorting information related to that animal. At step 450, sorting system 130 may compare the user's selected sorting criteria with the stored sorting information. The comparison may occur, for example, when sorting system 130 identifies an animal. Upon reading the identification tag, the controller may receive instructions from, for example, client computer 115 (step 460). The set of instructions may include opening and closing one or more gates leading into specific pens. At step 470, the controller may then operate the movement mechanism to lead the animals into their pens. Any other suitable approach for sorting may also be used.

Figure 18:
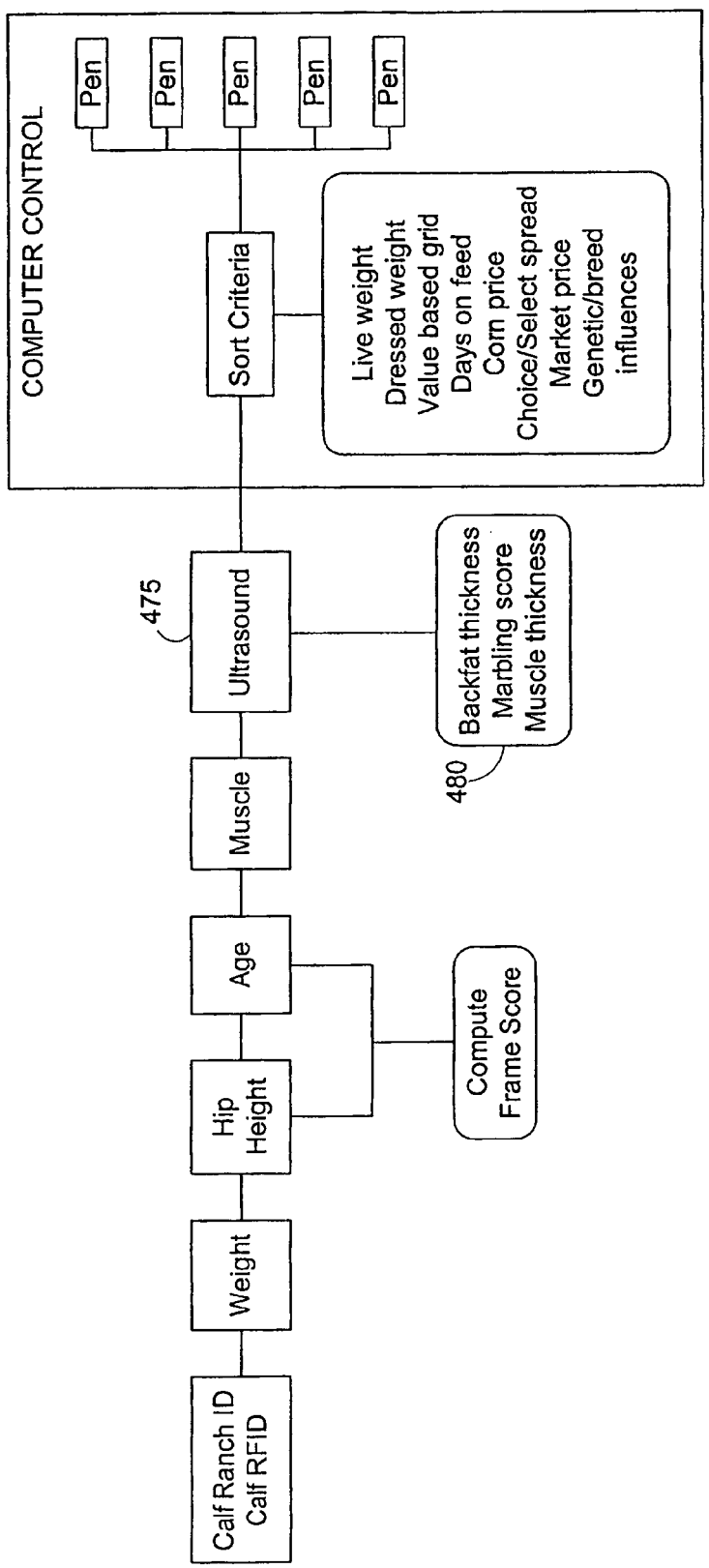
FIG. 18 is an illustrative block diagram of sorting information that may be collected for endpoint management, in accordance with the present invention.

FIG. 18 is an illustrative block diagram of the measurements and criteria that may be used to group animals at a feedlot for endpoint management. In one example, ultrasound 475 may be used to obtain ultrasound information 480. Ultrasound information may include backfat thickness, marbling score, and muscle thickness. Any other suitable approach may be used or any other information may be obtained.

It is well known in the art that end point management may be used to determine the length of time animals should be fed and the strategy for selling the animals. In this embodiment, along with the animal's weight, hip height, age, and muscle, ultrasonic measurements may be taken to estimate the animal's backfat thickness, muscle depth, and marbling in the longissimus muscle. Such information may be used to determine the number of days the animal should be fed before harvesting, and expected yield and quality grades. Animals may also be sorted by marketing options such as value-based grids, market prices, choice/select quality grade spreads, and/or any other marketing options. With these sorting techniques, a feedlot may sell animals based on their harvest date. These animals may be commingled for shipment to a packing plant.

In yet another embodiment of the present invention, users may virtually sort animals using sorting system 135. For example, if the user does not have the space or a large enough operation to physically sort the animals, sorting system 130 may virtually sort the animals. If a particular grouping of animals is required for a process or harvesting, the information is available for each animal. Instead of sending instructions to the controller and leading animals into a series of pens, sorting system 130 may send instructions to a user, such as a cowhand, to notch the visual identification tag.

Sorting system 130 is merely illustrative of the principles of this invention and various modifications may be made by those skilled in the art without departing from the scope and spirit of the invention.

Genetics Improvement System

Some embodiments may provide users with alternate methods for improving their operation. Through the information stored in the central database, users, such as producers and feedlot managers, may benchmark their operations against other operations (local or national). Users may analyze the information to make better decisions. In one approach, the system may provide the user with genetics improvement system 180. Genetics improvement system 180 enables users to improve the herd genetics. Genetics improvement system 180 may be standalone or may be included as part of the system. Any other suitable approach may also be used.

Genetics improvement system 180 may be used to improve the quality of animals through genetics. Users, such as cow-calf producers, require accurate, timely information to assure that their operation's productivity will yield maximum return on investment. Return on investment is affected by calf breakeven price, which is influenced by the ratio of pounds of calf weaned per cow exposed. The ratio of pounds of calf weaned per cow exposed consists of both reproductive and growth components that must be balanced. Genetics, and more specifically, the adaptability of the genetics to the specific environment (e.g., farm, ranch, etc.) are critical components of financial viability. Genetic traits may be grouped into reproductive performance, growth, disease resistance, and carcass characteristics. Although reproduction has been the most significant of the economically important traits, emphasis on value-based marketing has elevated the need for specific enhanced carcass characteristics.

The optimum ratio of pounds of calf weaned per cow exposed for a specific ranch begins by obtaining a high weaning rate (i.e., the percentage of live calves at weaning). Higher weaning rates result from elevated pregnancy rates combined with low levels of calving difficulty and low calf mortality. A user, such as a rancher, may desire to use bulls with lower birth weight EPDs (minimal dystocia) and high pre-weaning growth EPDs in order to enhance the ratio of pounds of calf weaned per cow exposed. A user concerned about calving ease will likely select replacement heifers with higher maternal calving ease EPDs and eliminate those with small pelvic areas. Monitoring such factors may lower veterinary costs and improve overall profitability.

Figure 19:
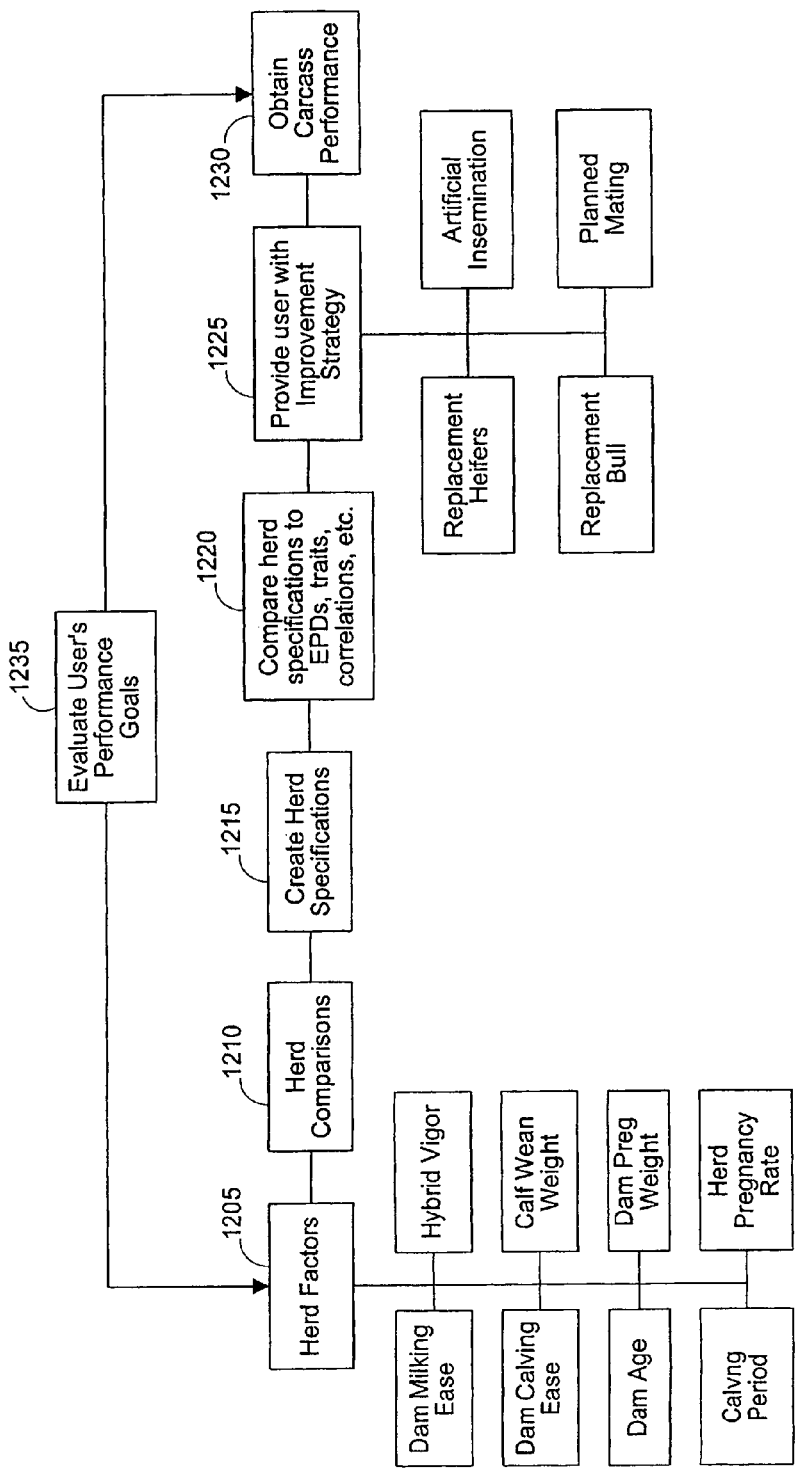
FIG. 19 shows a block flow diagram of the genetics improvement system, in accordance with the present invention.

Turning to FIG. 19, a block flow diagram of one example of genetics improvement system 180 of the present invention is illustrated. As shown, at step 1205, genetics improvement system 180 may identify herd performance factors important to, for example, ranch profitability. Herd performance factors may include length of calving season, calving distribution, pregnancy rate, calf weaning weight, dam weight at weaning, weaning rate, and the ratio of pounds of calf weaned per cow exposed. At step 1210, genetics improvement system 180 may access a database and compare the herd performance with performance information of other herds stored in a database. In some embodiments, genetics improvement system 180 may compare the herd performance to those of a ranch with highly profitable performance ratings. Genetics improvement system 180 may also develop one or more benchmarks based on averages of the herd performance information in the central database. A user, such as a rancher, may access genetic information of other ranches to improve his or her ranch. For example, a user may compare his or her operation against other operations in the same geographical area with desirable herd performance ratings.

At step 1215, genetics improvement system 180 may provide the user (e.g., a rancher) with an opportunity to create herd specifications. Herd specifications may include objectives of the user. Genetics improvement system 180 may aid the user in identifying the desirable traits in which genetics play an important roll for ranch production. The user may use the data to identify weaknesses in certain areas of herd performance that may be restricting return on investment. For example, if a calf's growth potential exceeds the ability of its dam to produce milk there may be a need to enhance the milk production of the cowherd through the use of bulls with higher milk genetics. Conversely, cows with the genetic ability for higher milk production may have inadequate nutritional resources in some environments and may be unable to consistently rebreed to maintain a twelve-month calving interval. Genetics improvement system 180 may identify the issues and assist with assuring an optimum match of genetics to ranch resources.

Genetics improvement system 180 may also compare the herd specifications to expected differences in the correlation between traits at step 1220. Genetics improvement system 180 may access the database for rules and empirical relationships determined by ranchers, veterinarians and animal science experts, or any other suitable experts. Genetics improvement system 180 may also determine if the specifications are conflicting. For example, birth weight and calving ease are inversely related. While birth weight and weaning weight are positively correlated. Therefore, selection for increased growth may result in higher birth weights and more calving difficulty. Too much emphasis on growth without regard for calving ease may elevate dystocia and compromise the health of the calf and dam's ability to rebreed.

At step 1225, genetics improvement system 180 may present the user with an improvement strategy. The improvement strategy may include replacement heifers, replacement bulls, sires for artificial insemination, a planned mating system and any other suitable strategy. In another embodiment, specific gene-based testing may be performed on individual animals to test for specific attributes such as tenderness, marbling, disease resistance, calving ease, feed to gain performance and other performance attributes. As these gene-based tests become available, they may be incorporated into genetic improvement system 180 and/or the system. These gene-based tests may be used as additional attributes in basing breeding decisions from as well as the screening or testing of general populations of cattle for specific attributes such as tenderness, marbling, or any other attributes. These genetic tests may be performed at nearly any time in the animal's lifetime or even after harvest at the packing plant.

In some embodiments, genetics improvement system 180 may search the database for suitable sires available for the artificial insemination with semen for sale. These sires may be used to enhance overall herd productively through an optimum combination of calving ease, calf growth and replacement heifer production. In another approach, genetics improvement system 180 may make suggestions of breed combinations that will enhance hybrid vigor, thus increasing fertility, and calf vigor along with enhancing the longevity and optimum performance of the cowherd.

Genetics improvement system 180 may determine the results of the genetic improvement process based on carcass data at step 1230. Carcass data may include yield grade, quality grade, carcass weight, marbling score, etc. Genetics improvement system 180 may up-load the carcass data to the database. Based on the carcass data and potentially a value-based marketing grid, genetics improvement system 180 may evaluate the financial performance of the user at step 1235. This system may further provide goals and improvement strategies for future production cycles. Thus, the user may continuously improve herd quality through genetics. This may result in a significant long-term enhancement of the productivity and overall profitability of the ranch.

In some embodiments, genetics improvement system 180 may enable a user to utilize genetics to improve the quality of an animal that has experienced a genetics test. For example, genetics improvement system 180 may receive the results of a genetics test (e.g., a genetics test may be performed by an authorized user and the results may be communicated to genetics improvement system 180). Genetics improvement system 180 may obtain attributes of the animal from the results. Attributes may include, for example, health information, disease information, or any other suitable information.

The attributes obtained from the results of the genetics test may be compared to multiple genetics rules stored in the central database. Based on the comparison, genetics improvement system 180 may select a genetics rule. Genetics improvement system 180 may present the user with a genetics improvement strategy based on the selected genetics rule. The improvement strategy may include replacement heifers, replacement bulls, sires for artificial insemination, a planned mating system and any other suitable strategy.

Genetics improvement system 180 is merely illustrative of the principles of this invention and various modifications may be made by those skilled in the art without departing from the scope and spirit of the invention.

Environmental Management System

In another suitable approach, the system may provide users with alternate methods for improving their operation, such as environmental management system 150. The system may include environmental management system 150 enabling users to manage waste byproducts, monitor the quality of the environment, plan growth, access safety margins, take appropriate corrective actions, and other suitable environmental plans. Environmental system 150 may be standalone or may be included as part of the system. Any other suitable approach may also be used.

In some embodiments of the present invention, environmental management system 150 may provide users, such as operators of animal feeding operations, crop growers, consultants, or any other suitable personnel, with tools for managing the environmental aspects of their operation so that the users comply with government regulations and protect the environment.

Figure 20:
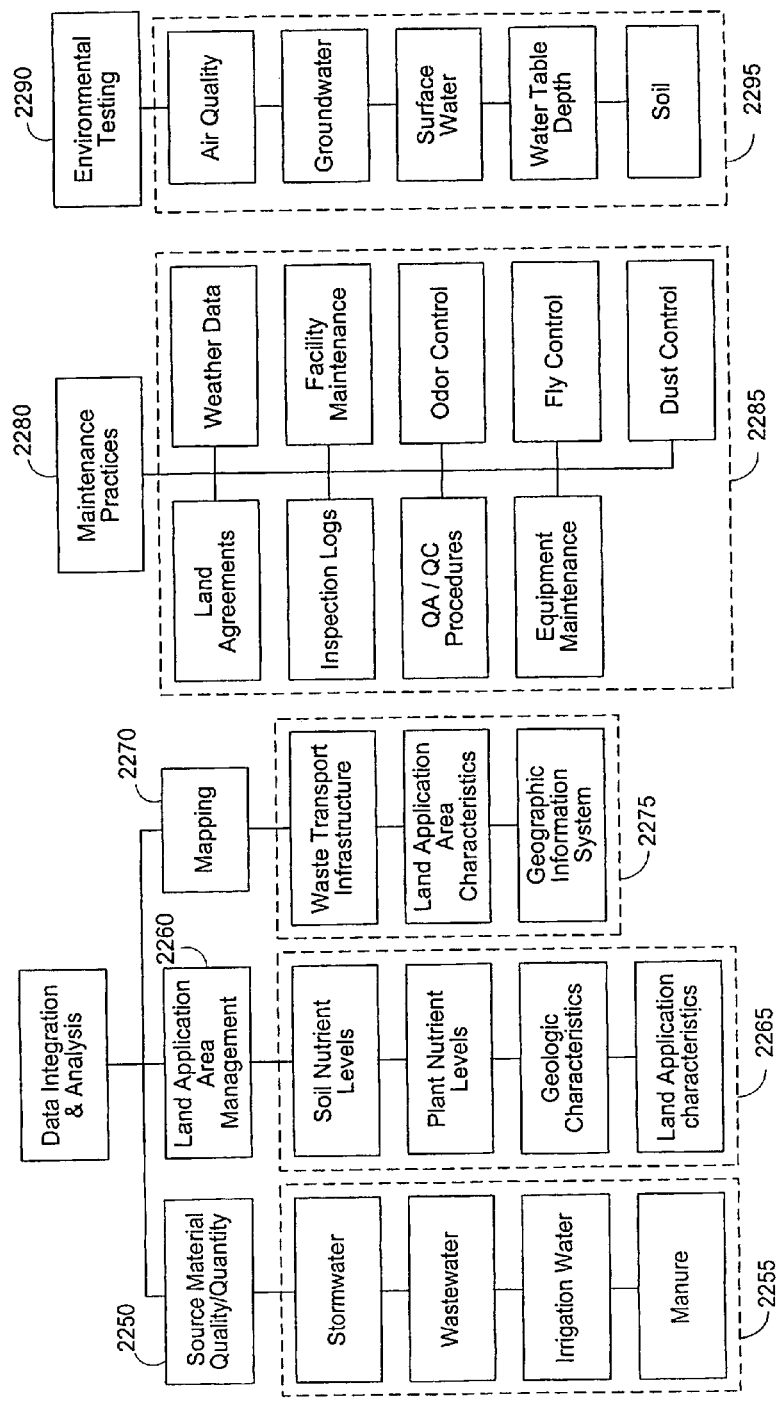
FIG. 20 is an illustrative block diagram of environmental information that may be collected by the environmental management system, in accordance with the present invention.

FIG. 20 shows one embodiment of the environmental information collected in environmental management system. As shown in FIG. 20, category 2200 shows a typical example of the environmental information collected by environmental management system 150. Category 2250 may be "source material quality and quantity" and may include data 2250 about source materials, such as manure, that contains nutrients. Nutrients such as nitrogen, phosphorus, and potassium may be present in source materials.

A user's livestock and operation may generate, receive, and/or handle nutrient-containing materials and by-products such as stormwater, wastewater, manure, compost, milling by-products, carcasses, irrigation water, fertilizer, precipitation, and other materials, as shown in area 2255. The user's operation may also generate air emissions from milling processes and lagoon microbial activity that must be monitored and managed. People skilled in the art will appreciate that other types of environmental information may also be taken.

Figure 21:
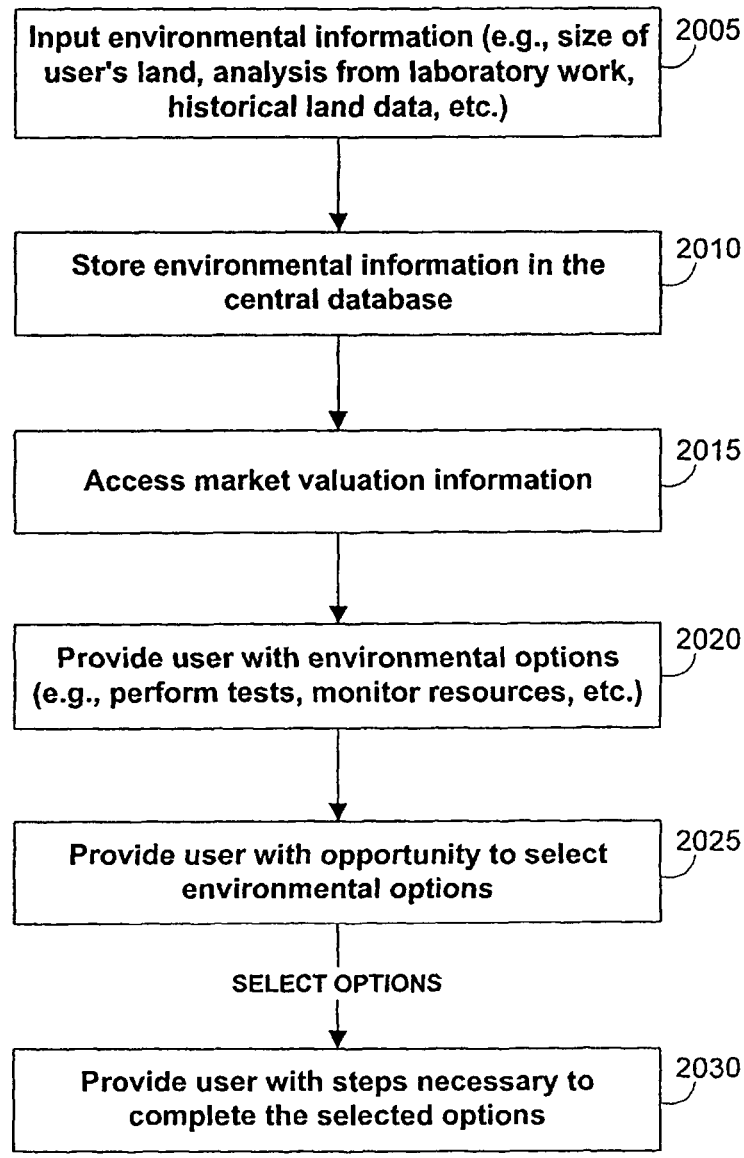
FIG. 21 is a flowchart of illustrative steps involved in providing environmental management options using the environmental management system, in accordance with the present invention.

FIG. 21 shows a generalized flowchart of steps involved in a user collecting environmental information with environmental management system 150. At step 2005, the user may input environmental information. Environmental information may include the size of the user's land, the distance to nearby bodies of water, the amount of manure and urine the user has collected, analysis from laboratory work, historical land data, and any other suitable information. When a user enters incorrect data values (e.g., out-of-range data values, missing data values, impossible data values, etc.) for a given parameter may be provided with a message requesting verification of the data value to ensure accuracy. Environmental information may be stored in the central database at step 2010.

At step 2015, the system may, for example, access market valuation information, which may be located in the central database. Market valuation information may be used to determine the environmental options for the user. Environmental options may include converting dead carcasses to animal feed, using x amount of manure on the user's fields, etc. Market valuation information may be processed by, for example, adaptive reasoning system 140 or any other knowledge-based tool. Environmental management system 150 may access other systems (e.g., adaptive reasoning system 140, integrated risk management system 125, etc.) to aid in identifying patterns, trends, or causes, and recommending actions.

The user is provided with environmental options at step 2020. The system may present the user with a list, checklist, or any other suitable approach for providing environmental options. The user may select one or more environmental options at step 2025. In response to the user selecting one or more environmental options, the user may be provided with the steps needed to complete the selected options (step 2030). Such steps may include tests that may be required at a predetermined time (e.g., once a week, once a month, periodically, etc.) for monitoring resources and the environment. For example, the user may be instructed to periodically monitor the quality of air, water, and soil on the premises and in the surrounding areas. Such tests may depend on the user's region, surrounding area, and the type of operation.

In some embodiments, environmental management system 150 may provide the process for taking the samples, conducting the tests, and/or the analyzing the results. In another suitable approach, environmental management system 150 may recommend a certified laboratory for conducting such tests. Upon receiving the results from the laboratory, the results may be stored in the central database. On-screen guidance may be provided to assist the user and to answer the user's questions, such as how and when to conduct required environmental testing (e.g., mandated by a regulatory agency).

The system may provide reminders to users about the need to complete a required activity, such as inspecting and recording lagoon liquid levels, servicing equipment, sampling a well or collecting an air quality sample. Upon entering the environmental information, the user may access the database, for example, via the Internet and store the data. The user may also print and/or send completed forms to others and query the database. When the user does not comply with a regulation or a required corrective action, the system may provide the user with a warning and/or remedial actions.

In some embodiments, source materials may need to be collected, stored, transported, and removed or utilized properly without polluting groundwater, surface water, or other natural resources. These source materials may have a nutrient value and may be used as fertilizer for crops or forage, or any other suitable use. In some embodiments, laboratory testing and analysis may be required for determining the nutrient value (quality) of the source materials. The environmental information gained from the analysis of source materials may be stored in the central database. In another suitable approach, users may input environmental information regarding the amount (quantity) of source materials that are collected, stored, transported, removed, and utilized. Upon collecting environmental information, users (e.g., operators, consultants, etc.) may query the central database via the Internet to access the environment information, such as the nutrient value (quality) of source material and the information about the quantity of source material that has been collected, stored, transported and removed or land applied.

In some embodiments, source materials may be applied on land application areas to provide nutrients for crops or forage. The land may be or may not be owned or controlled by the user. Environmental information on source material quality and quantity data may be integrated with environmental information on land application areas to determine the amount of nutrients spread on fields, and ensure nutrients are appropriately applied. However, any other suitable approach or other integration of information may also be performed.

Some embodiments may provide an application for land application area management, as shown in category 2260 of FIG. 20. Information about land application areas may be generated and inputted by a user. Environmental information 2265, such as soil and plant nutrient levels and recommended nutrient application rates, may be received and retrieved from laboratories, the user, and other suitable person or facility. The user may input environmental information regarding land application area characteristics, such as location and yield history of the land. The user may also input environmental information associated with the type of crop or forage being grown, the yield goal, the timing, amount, and quality of nutrient source material(s) that have been applied, and other characteristics. Environmental information associated with land application area management may be integrated with environmental information associated with source material quality and quantity to determine nutrient information. In some embodiments of the invention, users may select specific parameters (e.g., yield goal, etc.) and view integrated information, utilizing comparisons between the chosen parameters. Users may be provided with guidelines. For example, users may be provided with explanations of regulations governing aspects of the operation, such as "since soil in land application area no. 1 has an average of X pounds of phosphorus per acre, you should not apply more than Y pounds of manure."

Some embodiments may aid a user to comply with government regulations. The user may complete and send required forms to regulatory agencies, such as nutrient management on land application areas. The forms may be stored in the central database, sorted, and utilized to verify past compliance and future plans. In some embodiments, government agencies may utilize environmental management system 150 and/or the central database to receive, store, sort, and compile information from one or more users.

Some embodiments of environmental management system 150 may provide a user with a mapping feature 2270. Mapping feature 2270 may include electronically displayed maps relating to the physical characteristics of the user's operation. Maps may represent one or more aspects of the user's operation, such as locations of lagoons, and allow the user to modify (e.g., add, change, remove) items on a map and the environmental information associated with the items.

In some embodiments, the mapping feature 2270 of environmental management system 150 may utilize a geographic information system (GIS), as shown in area 2275. This system consists of layers of category-specific data represented spatially. Environmental management system 150 may access, for example, publicly available spatial geographic data via the Internet, as well as privately derived data. Layers may include facility layout, land application areas, waste transport infrastructure, manure stockpiles, and any data associated with physical characteristics represented on maps, including laboratory analysis results. For example, a layer may include land application fields associated with the operation that were spread with nutrients, together with data on nutrient concentration levels, crop type and yield goal, soil and plant nutrient levels, the nutrient threshold for the crop, and other information. In this embodiment, the user may be enabled to monitor the cumulative amount of inputs, such as nutrients and water, applied to fields and the remaining amounts needed to achieve production and environmental goals.

Map data may be represented in numeric and graphic format. The user may view data associated with a physical point of interest graphically and sort based on specific criteria to create a map that displays and compares points of interest and their affiliated data properties.

Environmental management system 150 may access other systems (e.g., adaptive reasoning system 140, integrated risk management system 125, compliance enforcement system 155, etc.) to aid in identifying patterns, trends, or causes, and recommending specific actions. The system may, for example, communicate with an accounting system to compare the value of nutrients in manure versus the market price of commercial fertilizer to determine which product is most economical to use at the current time.

As shown in FIG. 20, category 2280 is a typical example of the categories of operational maintenance practices that may be stored and utilized in environmental management system 150. In some embodiments, the user may be provided with maintenance practices, as shown in area 2285. Practices may include approaches for controlling flies, dust, pests, odor, and other nuisances. Environmental management system 150 may provide messages (e.g., on-screen messages) to prompt the user into filling out a prescribed maintenance form and completing an action item. For example, if source materials are transported from the user's operation to another location, the system may prompt the user to complete a form describing the amount of time, the date, the amount of material hauled, the name of the person receiving it, the location where it was applied, and other suitable information. At a predetermined time (e.g., at the end of the year), the user may then utilize environmental management system 150 to compile and summarize this information, and send it to the appropriate regulatory agencies.

Maintenance records may also include emergency plan templates and guidance to be completed by the user to plan for contingencies, such as a lagoon breach or a fuel spills. In another approach, the user may complete the proper forms to be utilized by management and the appropriate regulatory agencies. Completed forms may be sent (e.g., electronically or physically) to government agencies to provide documentation that required activities have been executed. Information contained in these forms may be stored in the database. In some embodiments, government agencies may utilize environmental management system 150 and the central database to receive, archive, sort, and manage environmental information and other suitable information from users.

In another suitable approach, when a user's operation closes, the user may be responsible for cleanup of any material on the property subject to regulation. The present invention may provide for a template and guidance to assist the user in developing a closure plan. The system may provide archiving of the completed plan, and occasional reminders to verify that the plan is current.

The system may also allow the user's environmental information to be included with other information stored on individual animal's EID tag. For example, weather data associated with an animal's stay at a given user's facility or transport conditions such as time and mileage transported may be included on the EID. The user may use this information for health and performance analyses purposes.

In some embodiments, environmental management system 150 may provide the user with quality assurance and quality control information pertaining to collecting, handling, storing, transporting and testing environmental options (e.g., environmental testing option 2290). Such options may include all of the source materials shown in Category 2200, as well as air, groundwater, surface water, and soil quality (e.g., as shown in area 2295). The system may describe the specific equipment and procedures needed to insure that the final test results are valid. This may include a list of the collection supplies needed, the steps that must be followed to obtain a representative sample, sample storage and transportation issues, and testing procedures. The system may recommend that some parameters be tested by a certified laboratory. In some embodiments, the system may provide government-specified regulatory quality assurance/quality control measures to be taken by the user.

Environmental management system 150 is merely illustrative of the principles of this invention. Those skilled in the art may make modifications without departing from the scope and spirit of the invention.

Adaptive Logistics System

In another suitable approach, the system may include, for example, adaptive logistics system 135 to enable users with efficient managing of shipping and logistics upon purchasing animals. Adaptive logistics system 135 may obtain information from the central database to deliver animals from multiple sales locals and facilities. Adaptive logistics system 135 may be standalone or may be included as part of the system. Any other suitable approach may also be used.

Typically, feedlots, ranchers, backgrounders, and other members of the supply chain must manage their own shipping transactions. For example, a rancher may sell a truckload of animals to a feedlot, and the rancher and feedlot manager must determine how to ship the animals. Typically, the shipping transactions are not integrated into the other management systems within their overall operation.

Figure 22:
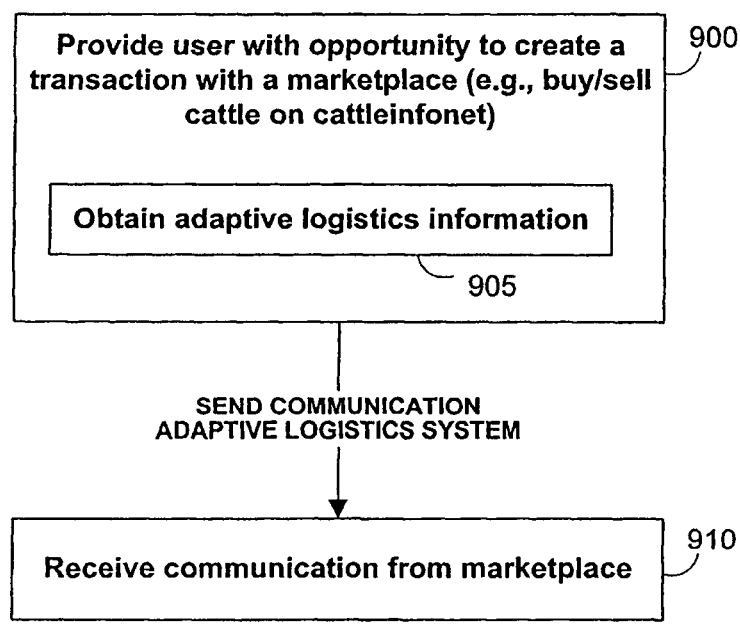
FIG. 22 is a flowchart of illustrative steps involved in receiving adaptive logistics information, in accordance with the present invention.

FIG. 22 is an illustrative flowchart of steps involved in obtaining adaptive logistics information. At step 900, adaptive logistics system 135 may provide a user (e.g., a rancher) with an opportunity to make a transaction with another user (e.g., a buyer on "Cattleinfonet" or any other buyer). For example, a rancher may desire to sell one or more animals to a buyer. Adaptive logistics information can be obtained at step 905. "Cattleinfonet" or any other suitable marketplace may send a communication to adaptive logistics system 135. At step 910, adaptive logistics system 135 may receive the communication from the marketplace. The communication may include shipping details, which may include pick-up location, drop-off locations, number of animals to be picked up, total weight, time of pick-up, expected weather conditions, and/or any other suitable shipping details.

Figure 23:
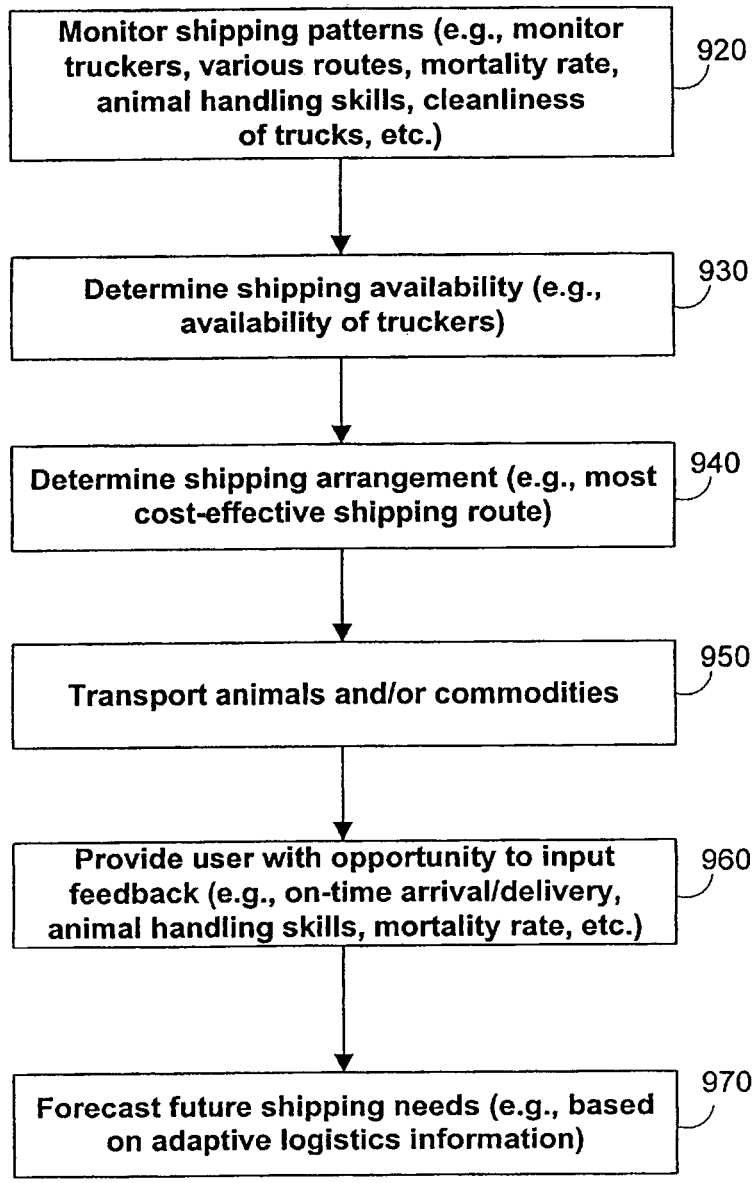
FIG. 23 is a flowchart of illustrative steps involved in shipping animals using adaptive logistics system, in accordance with the present invention.

FIG. 23 is a flowchart of illustrative steps involved in shipping animals using adaptive logistics system 135. At step 920, adaptive logistics system 135 may monitor shipping patterns. Monitoring shipping patterns may include monitoring the performance, various routes, the mortality rate, the animal handling skills, and the cleanliness of various truckers.

Figure 24:
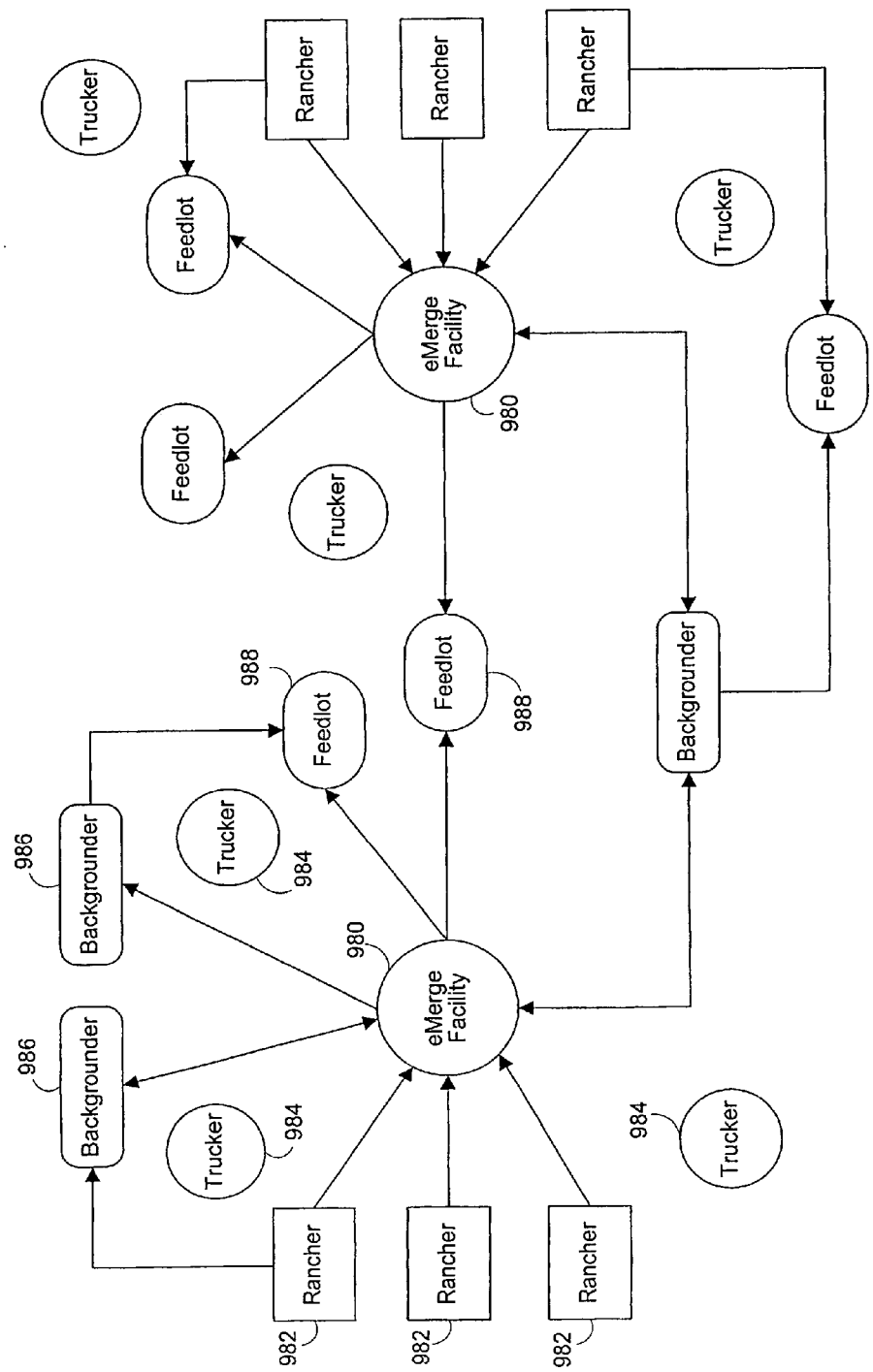
FIG. 24 is an illustrative flow diagram showing the transport of animals between various locations, in accordance with the present invention.

Upon making a transaction, adaptive logistics system 135 may determine the shipping availability by identifying available truckers based on their proximity to the pick-up and drop-off locations and past performance record at step 930. That is, adaptive logistics system 135 may allow the user to view one or more shipping arrangements. At step 940, adaptive logistics system 135 may determine the shipping arrangement by suggesting one of the available truckers based on minimum transportation cost, minimum animal stress, minimum mortality rate, maximum truck revenue miles, etc. Adaptive logistics system 135 may also optimize the transport of animals between, for example, eMerge facilities or assimilation sites, suppliers, and/or customers as shown in FIG. 24. The criteria for optimization may change with different customers and business needs.

Adaptive logistics system 135 may also provide the user with a notification of the selected shipping arrangement. In some embodiments, adaptive logistics system 135 may allow the user to view the status of the shipment. For example, the user may track the shipment and view the approximate location of the shipment.

At step 950, the animals and/or commodities may be transported. Adaptive logistics system 135 may allow users (e.g., customers) to provide feedback at step 960. Feedback may be provided in terms of condition of animals, animal shrinkage during shipment, mortality rate, morbidity rate, transportation time, on-time pickup and delivery, and any other suitable feedback. Feedback may be entered and stored in the central database, which may share this adaptive logistics information with the other systems and/or users.

Adaptive logistics system 135 may further determine a shipping arrangement for the return trip. Typically, a trucker may ship an animal or commodity to the user and return with an empty truck. Adaptive logistics system 135 may optimize the trip by determining animals and/or commodities that may be delivered on a return trip.

Adaptive logistics system 135 may further identify suitable locations for new facilities, such as eMerge facilities, assimilation sites, or any other facility, based on transportation data and committed transactions for future livestock purchases and deliveries at step 970. Based on future orders and projections, adaptive logistics system 135 may forecast future trucking needs so that fleet adjustments may be made. These adjustments may be made on a route, regional, and/or state basis. Users may also be provided with opportunities to track the progress of any shipment by, for example, accessing a web page via the Internet, via a wireless PDA system, or using any other suitable approach.

In FIG. 24, eMerge facility 980 may be an intermediary. As an intermediary, eMerge facility 980 may track transactions completed by users (e.g., buyers, consumers, etc.). For example, a transaction may occur when rancher 982 sells cattle to backgrounder 986. In another example, rancher 982 may transport his or her cattle to feedlot 988. eMerge facility 980 may receive revenue from rancher 982, backgrounder 986, and/or feedlot 988. eMerge facility 980 may contact available trucker 984 to perform the transfer of animals. eMerge facility 980 may maintain a list of available truckers for transporting animals and any other suitable commodities.

In some embodiments of the present invention, adaptive logistics system 135 may provide users with opportunities to design trailers suitable for transporting a variety of commodities. For example, a user may desire to design a trailer that transports livestock on outbound trips and haul feed (e.g., hay, corn, silage, or any other suitable commodity) on the return trip. Thus, adaptive logistics system 135 may increase truck revenue miles and thereby lower overall livestock shipping costs.

Although this embodiment uses the example of shipping from a rancher to a feedlot, adaptive logistics system 135 may also manage transactions such as shipments from a ranch to an assimilation facility, shipments from a background to an assimilation facility, drop shipments from a backgrounder to a feedlot, shipments from an assimilation facility to a feedlot, shipments from an assimilation facility to a backgrounder, or any other suitable transaction. Adaptive logistics system 135 is merely illustrative of the principles of this invention. Those skilled in the art may make modifications without departing from the scope and spirit of the invention.

Supply and Demand Management System

Users, such as buyers and sellers of animals, may desire to manage their sales and acquisitions. The system may include supply and demand management system 170, which provides a user with the capability of viewing supply and demand orders, filling orders, searching for animals with specific criteria, and managing future purchase agreements. Supply and demand management system 170 may be standalone or may be included as part of the system. Any other suitable approach may also be used.

In some embodiments of the present invention, supply and demand management system 170 may provide users with a real-time inventory of animals (supply) along with current and future orders (demand). For example, this may include animals at assimilation sites, auctions barns, and ranches committed to supply animals under long-term purchase agreements. One or more buyers and/or sellers may access supply and demand system via the Internet, through a virtual private network system, or using any other suitable approach. Orders may be placed on supply and demand management system 170 for future requirements and may be viewed by prospective sellers.

In some embodiments, supply and demand management system 170 may guide the user (e.g., a buyer or a seller) through a series of interactive displays designed to share trading information on the animals and assist in making a transaction and to better manage their inventory. Trading information may include price, cost and desired sale price (markup) for a particular day as well as future requirements. Other information on the specific animal or lot of animals may also be made available such as genetic, health, process, age, and any other suitable information. Access to trading information may be limited to users with proper security clearance.

In some embodiments, supply and demand management system 170 may allow a user to manage orders for multiple animals. Supply and demand management system 170 may allow a user to enter attributes of each of the multiple animals into the central database. In some embodiments, supply and demand management system 170 may access beef marketing program requirements in the central database. To determine which animals comply with the program requirements, supply and demand management system 170 may compare the entered attributes to the program requirements.

Based at least in part on the comparison, supply and demand management system 170 may automatically facilitate at least one transaction between multiple users. In some embodiments, the multiple users may be at different locations. For example, when a user desires to purchase twenty cattle, supply and demand management system 170 may determine which cattle meet the user's requirements and may purchase the cattle from multiple users (e.g., ten cattle from one user and ten cattle from another). When a transaction has been completed, supply and demand management system 170 may update the inventory of animals.

Illustrative user interface approaches are described below. While the approaches are described separately, their features may be combined in any suitable way, modified in accordance with the other approaches, or performed instead of or in addition to the features described. The categories may be interchanged where suitable. Any other suitable combination, substitution or exchange of features between the interface approaches described herein, or with any other suitable interface approach, may also be used.

Figure 25:
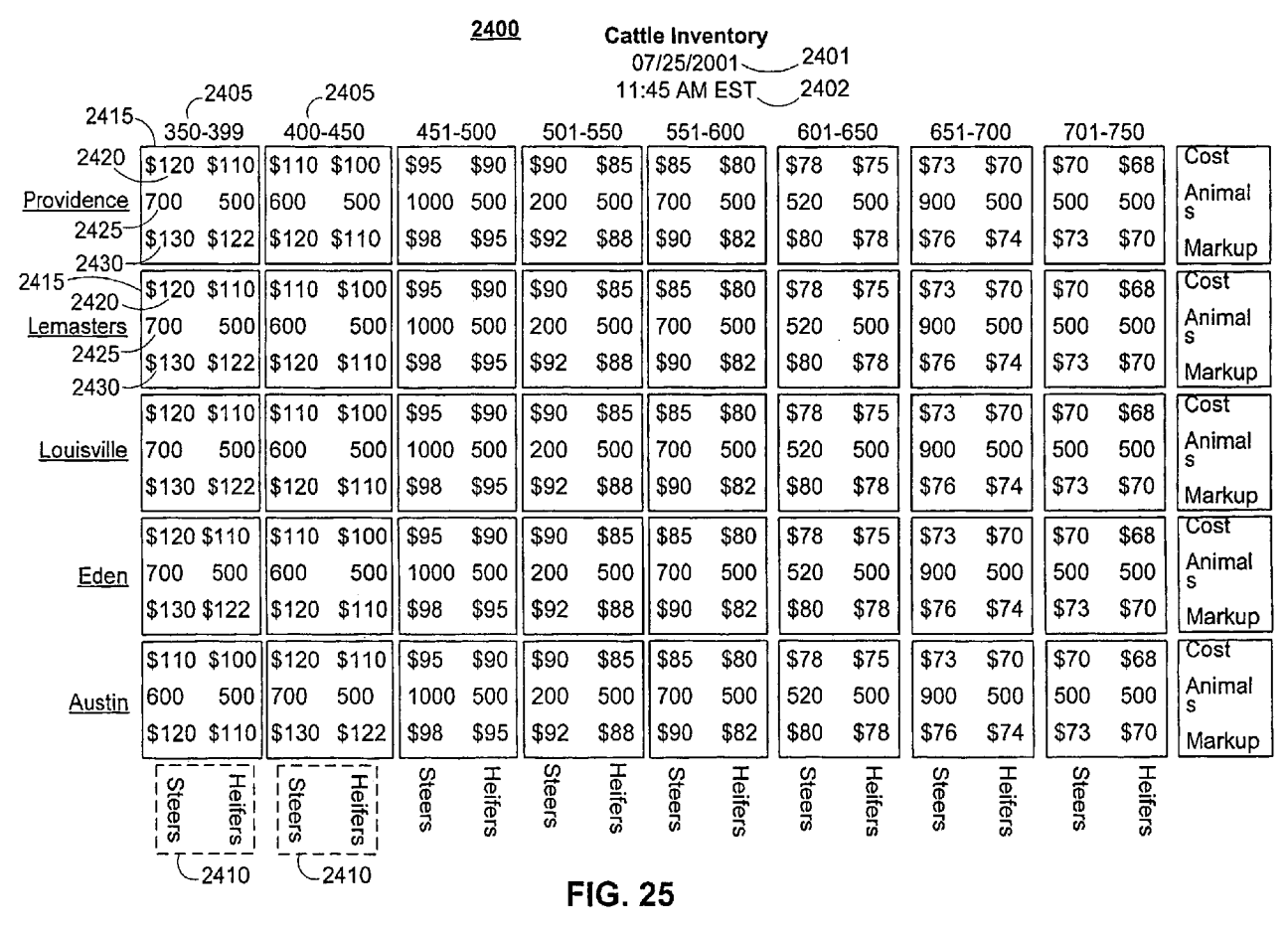

FIG. 25 is an illustrative display screen 2400 that the present invention may display when providing access to inventory or order information. In this example, display 2400 shows the animals at each facility and sorted into weight categories 2405. Categories 2410, such as heifers and steers, may be used to further segment each weight category. For each inventory area 2415, display 2400 may provide users with the average animal cost 2420, number of animals available 2425, and the expected sale price for the day 2430. The selling price may be updated, for example, daily by local sales management or be controlled via an adaptive reasoning system as described herein. The markup price may reflect the market demand and may also reflect the appropriate futures or commodity prices for the livestock. The invention presents the user with markup price 2430 and average animal cost 2420 to provide the user with the revenue potential for a transaction. Display 2400 may also include date 2401 and time 2402 and location.

In some embodiments, supply and demand management system 170 may provide the user with flexibility to fill an order from one or more facilities. For example, for a large order, a user may pool the animals from different facilities and coordinate their deliveries to the customer. In another approach, a user (e.g., a seller) may be able to satisfy another user's (e.g., customer's, buyer's, etc.) price constraint with animals from another facility (e.g., a sister facility) that may have a lower average cost or markup price than the user's facility.

In some embodiments, supply and demand management system 170 may determine the average cost of the animals in an inventory category. For example, supply and demand management system 170 may implement a recursive relationship to compute the average cost of the animals in an inventory category. In a purchase transaction, the animals in weight category 2405 may be bought as a group. As new animals are added to inventory category 2415, the average animal cost is adjusted as per the following equations:

$$C_{avgnew} = (C_{avgold} * N_{old} + C_{add})/(N_{old} + N_{add})$$

$$N_{new} = N_{old} + N_{add}$$

where: $C_{avgnew}$ is the new average cost;
$C_{avgold}$ is the old average cost;
$N_{old}$ is the number of animals in the group before additions;
$N_{add}$ is the number of animals added to the group;
$N_{new}$ is the number of animals in the group after additions; and
$C_{add}$ is the cost of animals added to the group.

However, when a group of animals is sold, the average cost of the remaining animals in the inventory category does not change. The number of animals in the group is adjusted using the following equations:

$$C_{avgnew} = C_{avgold}$$

$$N_{new} = N_{old} - N_{sold}$$

where $N_{sold}$ is the number of animals sold from the group. When an order is booked, the animals may be reserved, and the data as shown in FIG. 25 may be updated at a predetermined time (e.g., immediately, periodically, every hour, every day, etc.). Preferably, display 2400 is updated immediately to prevent over committing to other users (customers).

Although display 2400 is illustrated with the same inventory group nomenclature for itemizing animals, this is merely illustrative of the principles of this invention and various modifications may be made by those skilled in the art without departing from the scope and spirit of the invention. In some embodiments, the present invention may require that all facilities within supply and demand management system 170 group animals in a standard manner as shown in FIG. 25. In order to simplify costing and minimize administrative tasks, the present invention may desire that purchase orders and sale orders also use the same inventory group nomenclature as the facilities for itemizing animals.

In some embodiments of the present invention, the user may customize display 2400. In one suitable approach, a user (a seller) may desire to only deal with feedlots. The user's customers may desire to buy animals between 650 and 750 lbs. and animals that are raised in a specific part of the country. In such a case, the user may choose to display animals in the weight categories 651-700 and 701-750 and from facilities from that geographical area.

In another approach, supply and demand management system 170 may provide the user with an interface for viewing demand orders, similar to the interface shown in FIG. 25. For example, a display (not shown) may present the animals needed at each facility and purchasing criteria. A user (e.g., buyer) may post on the display the number of animals needed by weight, the desired number of heifers and steers, and the expected price to pay for an animal. As in display 2400, the expected price may be updates. Allowing users to view demand orders may, for example, enable users (e.g., producers) to observe market projections and adjust their operations accordingly.

In response to submitting demand orders, supply and demand management system 170 may search for facilities that produce animals matching the user's purchasing criteria. Users may be notified when their demand orders are matched. Upon receiving a notification, users may place future purchase agreements. These future purchase agreements may be entered and stored in the central database.

Some embodiments may include a real-time online display of future purchase agreements entered by supply and demand management system 170. The real-time display may show the agreed price, the expected weight categories, the number of animals per weight category, the time of arrival of each batch of animals, the deposit paid to the rancher, and the amount of payment due upon receipt of all the animals. In another suitable approach, the real-time display may show future deliveries committed to customers by supply and demand management system 170. The display may show the agreed price, the weight categories of animals to be delivered, the number of animals per weight category, the deposit received from customer, the delivery date, and the amount of payment expected upon shipment of animals to the customer.

In some embodiments, the real-time displays may be used to manage cash flow and control inventory proactively on a system wide basis. For example, limits may be placed on total number of animals per weight category at each facility. Once this limit is reached for a category then no user may be permitted to buy any more animals in that weight category for that facility. Also, the company may have a cap on the total inventory value of all animals in supply and demand management system 170 for a facility. Once this limit is reached, management at the facility may be required to reassess the market conditions, stop all purchase transactions, and adjust markup prices. The real-time on-line displays may also be used to assess the cash flow from cattle transactions on a daily basis, keep track of interest rates, and secure better financing terms from agricultural banks or other financial institutions.

In some embodiments, the present invention may also be used to determine the shipping requirements, shipping costs, and determine the necessary adjustments or arrangements with trucking companies. This may be on a regional, county, state, or national level. The shipping requirements determined by the present invention may be, for example, uploaded to adaptive logistics system 153 or any other suitable logistics system.

In some embodiments, the user may be provided with one or more programs (e.g., software) and information via the Internet to allow users to present the data in the form of charts, tables, and customized reports. Such programs may enable the user to make timely and informed decisions on inventory related matters.

Supply and demand management system 170 is merely illustrative of the principles of this invention. Those skilled in the art may make modifications without departing from the scope and spirit of the invention.

Electronic Commerce System

In another approach, the system may provide users with additional methods of managing their sales and acquisitions. The system may include electronic commerce system 190 which may provide a user with the capability of purchasing, selling, and viewing animals over the Internet. Electronic commerce system 190 may be standalone or may be included as part of the system. Any other suitable approach may also be used.

Figure 26:
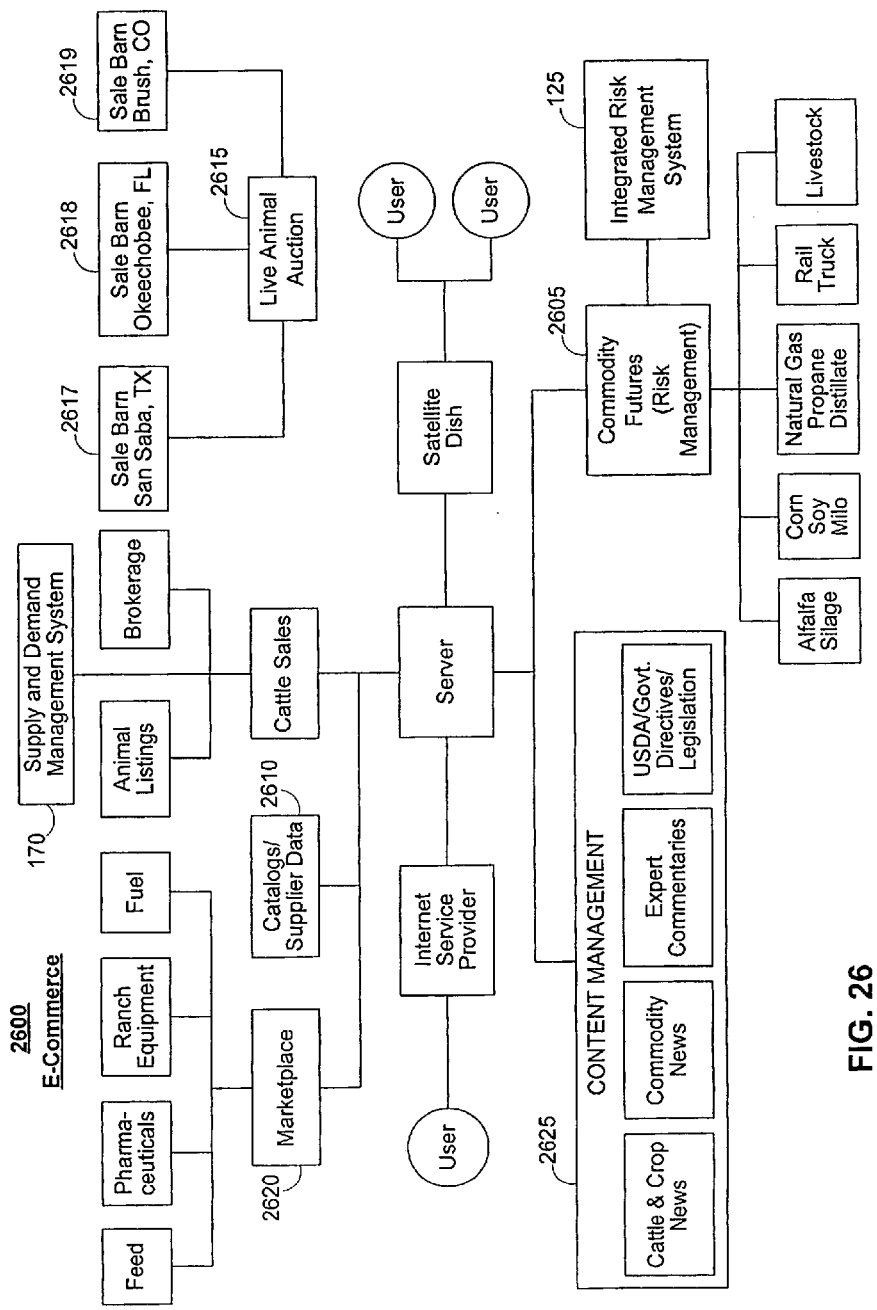
FIG. 26 is an illustrative block diagram of the features of the electronic commerce system, in accordance with the present invention.

The livestock management system creates an information infrastructure for monitoring livestock and related transactions throughout the supply chain. This information may assist users desiring to trade livestock, products, commodities, and services on the Internet. For example, the animals in the Livestock Management System may be sold on the Internet through portals like "Cattleinfonet." Pharmaceuticals, feed, spare parts, and other materials may also be ordered through web sites on the Internet. Electronic commerce system 190 may lower cost, reduce transactions, trim lead times, increase product availability, identify new sources and options, and improve the overall efficiency of a user's operation in the livestock supply chain. FIG. 26 shows one embodiment of electronic commerce system 190.

Electronic commerce system 190 may be a catalog auction, a marketplace, an online brokerage, a real-time sale barn, auction, a product catalog, an online commodity futures trading, etc. Electronic commerce system 190 may be part of or communicate with other systems, such as adaptive reasoning system 140, adaptive logistics system 135, environmental management system 150, sorting system 130, tracking system 145, integrated risk management system 125, or any other suitable system.

In some embodiments, electronic commerce system 190 may be an online catalog auctions 2610, which may, for example, solicit bids on animal lots available for immediate or future deliveries. Catalog auctions 2610 may provide global market coverage for a user, such as a seller. Animal lots may be listed to provide information, such as animal weight, breed mix, preconditioning, quantity and breakdown by sex, slide, expected delivery date, pickup location, and any other information to a user (e.g., a buyer). Pictures (e.g., taken by a digital camera) and video footage may be provided for browsing. A time limit may be set (e.g., by a seller, by electronic commerce system 190, etc.) for accepting a bid. In one suitable approach, the user's asking price and the current highest bidding price may be listed and continuously updated. The user may change the asking price at any time during the auction time limit. At the end of the time limit, the user may accept the highest bid or opt to auction his or her animals later at the same or different web site. Electronic commerce system 190 may charge a fee for hosting the auction and may collect a commission fee if a lot is sold. Manufacturers and service providers may also advertise or auction their products and services on electronic commerce system 190. However, any other suitable approach may also be used.

In some embodiments, electronic commerce system 190 may be a sale barn auction system 2615. Sale barn auction system 2615 may be a real-time sale barn auction. Sale barn auction system 2615 may, for example, provide a national audience for auctions at local sale barns. A user may bid for animals via the Internet in real-time for animals being auctioned at a local sale barn. As shown in FIG. 26, barn 2617, barn 2618, and barn 2619 are sale barns that may be connected to sale barn auction system 2615 for real-time auctioning. For real-time auctioning, live video and voice data may be provided to the user by streaming them over the Internet. One or more sale barn auctions (e.g., several real-time sale barn auctions) may be in progress at one time. For example, a user (e.g., a buyer) may attend an auction from the user's location and change channels to observe another location or venue.

Sale barn auction system 2615 may also provide a larger audience of buyers to a sale barn. For example, for the local producer, the real-time sale barn auction may have more buyers bidding on his animals versus being limited to few buyers physically present at the sale barn. Sale barn auction system 2615 may provide a local sale barn to use sale barn auction system 2615 to create a national reputation for selling specific type of cattle. For example, a sale barn may have real-time auctions for animals certified to a high quality health, nutrition, and management program. Animals raised under these programs may have a proven track record for superior performance at feedlots. A larger audience of buyers for these special auctions may bring a higher price for these animals. As a result, a producer may prefer to sell his animals through a sale barn with real-time auction capability. Sale barn auctions system 2615 may require users to install additional hardware and software on their computer systems. They may also require a direct high-speed satellite link or any suitable communications link.

In some embodiments, electronic commerce system 190 may serve as a repository of supplier product catalogs and technical data. Users may access these catalogs to gain product information, make purchase decisions, order spare parts, use technical data for problem solving, configuring new equipment, and/or designing and developing new systems. Suppliers may pay a fee for hosting their catalogs on electronic commerce system 190. In another approach, suppliers may also pay a commission on products and services purchased by a user through electronic commerce system 190.

In some embodiments, electronic commerce system 190 may be a marketplace 2620. Marketplace 2620 may provide products and services to users and serve as the purchasing agent. For example, marketplace 2620 may be a one-stop storefront for products and services used by ranches and feedlots. For example, marketplace 2620 may offer lower prices than some local sellers. Marketplace 2620 may also consolidate the purchases for manufacturers and provide them a wider sales reach. Marketplace 2620 may offer several competing brands. A user may receive a volume discount based on the user's total purchase as compared to a discount from the volume purchase of one specific item. For example, marketplace 2620 may require the user to have a credit approval to purchase items that may be needed for the user's operation as opposed to several credit agreements with sellers and vendors. Marketplace 2620 may also assist in financing the purchases at a lower rate through a special arrangement with financial institutions, farm cooperatives, credit unions, or agricultural banks.

Marketplace 2620 may offer services for veterinarian clinics, processing crews, pest control, nutrition analysis, or ultrasound at feedlots for endpoint management. In another approach, marketplace 2620 may assist in identifying service providers near a user. Marketplace 2620 may have a network of preferred providers of veterinary services (veterinarians and clinics) for providing services such as spaying, pregnancy checking, fertility testing, or calls for treating a sick animal. These preferred providers may be under contract with marketplace 2620. In response to contracting a service from a service provider, marketplace 2620 may, for example, assist in scheduling service calls and may dispatch a service provider under contract with marketplace 2620. The provided service may be at rates lower than local commercial rates. Marketplace 2620 may have a franchise network of service providers in order to promote practices and products, and control consistency and quality of service provided. For example, the franchise ultrasound service may assist a feedlot manager in endpoint management. This may include sorting the animals on the basis of days on feed determined from measurements for back-fat thickness and marbling, corn prices, and market conditions. This service may recommend the market grid for selling these animals and their expected quality and yield grades. The days on feed information may assist the feedlot manager in scheduling shipments to a packer and avoid haggling with the packer order buyer on how much longer to feed the animals before shipping.

Electronic commerce system 190 may include content management system 2625, which may provide agricultural- and livestock-related news and summaries necessary for making operational decisions consistent with market conditions. News and summaries may include cattle and crop news, commodity prices at various mercantile exchanges like the Chicago Mercantile Exchange, commentaries from veterinarians, animal scientists, epidemiologists, nutritionist, and extension people on a current topic, legislation in progress at state and federal governments, weather, and export markets. Content management system 2625 may provide users with links such as the "hot agricultural topics of the day" like Bovine Spongiform Encephalopathy (BSE), beef check-off, grazing rights on federal lands, etc. Content management system 2625 may also provide chat sites to facilitate education and communication between producers and industry experts. Content management system 2625 may host online education sessions on topics like risk management, ranch management, genetics, good management practices, etc.

In some embodiments, electronic commerce system 190 may include commodities futures system 2605. Commodities futures system 2605, integrated risk management system 125, a combination of the two, or any other suitable risk management system may provide risk management options to the users (e.g., farmers, ranchers, etc.) in the livestock industry. For example, a rancher may enter futures contracts on several commodities such that the combined package is optimal for the rancher's operation. Commodities futures system 2605 may identify commodity traders (e.g., by proximity, by cost, etc.). In another approach, commodities futures system 2605 may compile a network of preferred commodity traders and/or brokers that may offer futures trading for one or more commodities used in the livestock industry. The commodities may include cattle, corn, soy, milo, alfalfa, silage, fuel (diesel, natural gas, propane, and distillate), and transportation (rail or truck).

As discussed above, electronic commerce system 190 may also be a part of or communicate with (e.g., be linked to) supply and demand management system 170, integrated risk management system 125, and/or any other suitable system. For example, a user may access supply and demand management system 170 or any other suitable system to obtain a user's inventory of animals. This may assist users in the livestock industry with, for example, assessing the availability of animals, and planning production and marketing strategies. Users may desire to access to integrated risk management system 125 through electronic commerce system 190. Integrated risk management system 125 may provide users with, for example, an interface with an online expert (e.g., via voice, text, etc.) or an expert system (knowledge-based tool) to determine a strategy for minimizing financial risks of the users (e.g., a breakeven analysis). For example, the strategy may include a mix of forward contracting, futures contracts, call/put options, private treaties, and leasing.

In some embodiments, electronic commerce system 190 may assist a user in purchasing livestock relating to a selected beef marketing program (e.g., Angus beef) based on information collected in the central database. Electronic commerce system 190 may access beef marketing program requirements from the central database. The information collected on an animal may be compared with the program requirements. Electronic commerce system 190 may provide the user with livestock purchase decision information. Purchase decision information may include, for example, compliance with specific beef marketing programs, weight information, health information, or any other suitable information. Such purchase decision information may assist the user to purchase the livestock and may allow the user to ensure that the purchase livestock complies with the selected beef marketing program.

In some embodiments, electronic commerce system 190 may assist a user in selling livestock relating to a selected beef marketing program (e.g., Angus beef) based on information collected in the central database. Electronic commerce system 190 may access beef marketing program requirements from the central database. The information collected on an animal may be compared with the program requirements. Electronic commerce system 190 may provide the user with livestock sale decision information. Purchase sale information may include, for example, compliance with specific beef marketing programs, weight information, health information, or any other suitable information. Such purchase sale information may assist the user to sell livestock and may allow the user to ensure that the sold or to be sold livestock complies with the selected beef marketing program.

Electronic commerce system 190 is merely illustrative of the principles of this invention. Those skilled in the art may make modifications without departing from the scope and spirit of the invention.

In another approach, the system may provide users with additional methods for managing their operation. Based on information, such as information stored in the central database, the system may include integrated risk management system 125 which may determine risk levels and provide users with advice on offsetting risk in their operations. Integrated risk management system 125 may be standalone or may be included as part of the system. Any other suitable approach may also be used.

Integrated Risk Management System

Producers in the agricultural industry may need to plan their production almost a year and half in advance before their products (livestock, crops, etc.) reach the market. Typically, demand for the producer's products is seasonal and subject to fierce competition from alternative food supplies. Prices for agricultural production may be affected by several factors beyond a producer's control. For example, livestock demand may decline rapidly due to a change in consumer dietary habits, health warnings, a surge in imports, a decline in exports due to new tariffs, or a downturn in the domestic economy. In addition cost of feed, fuel, and other raw materials needed for agricultural production may be subject to seasonal price fluctuations and weather conditions. For example, drought conditions may increase cost of feed beyond what producers can afford. This may force producers to sell off their livestock to minimize loss. As another example, high fuel prices may erode their profit margin. Integrated risk management system 125 may provide tools for ranchers, farmers, feedlots, and others in the agricultural industry (herein referred to as "users") to plan for these contingencies. Integrated risk management system 125 may result in a substantial gain in cost-effectiveness so that the overall financial gain of the user's operation is improved.

Figure 27:
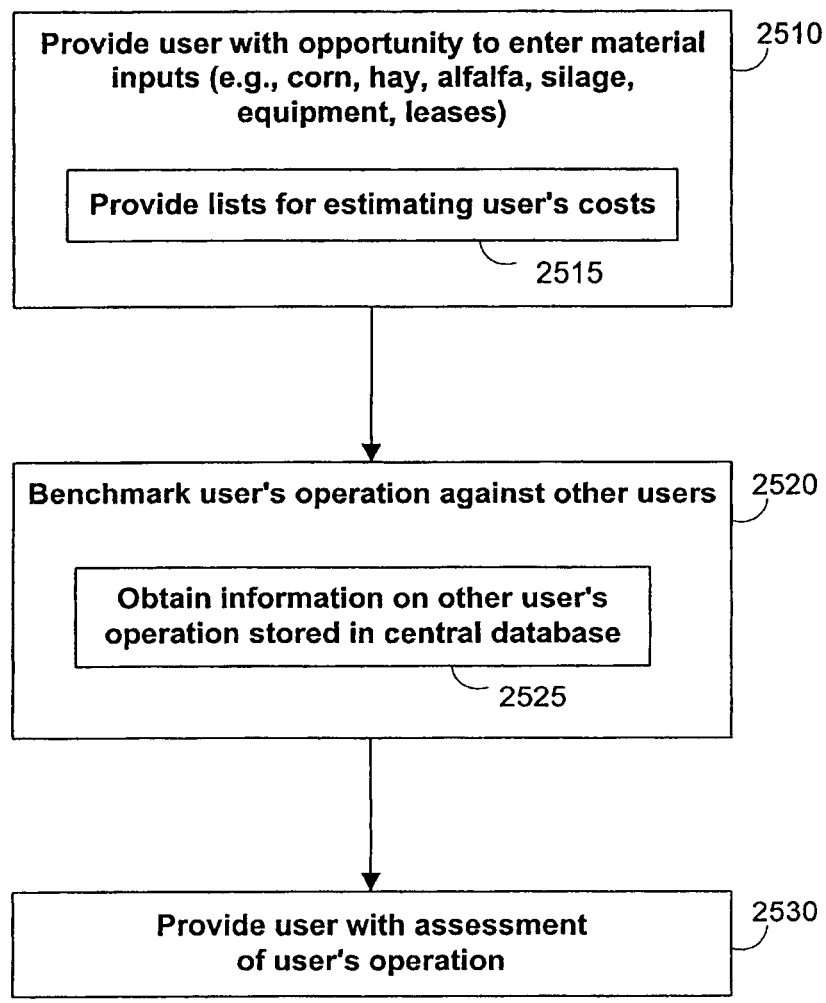
FIG. 27 is a flowchart of illustrative steps involved in providing the user with an assessment of the user's operation using the integrated risk management system, in accordance with the present invention.

In some embodiments, the user may be provided with a tool for evaluating a user's operation. Evaluating the user's operation may involve, for example, examining operating costs, material requirements, and/or profit goals. FIG. 27 is a generalized flowchart illustrating the steps involved in process 2500 for providing the user with integrated risk management tools. As shown, at step 2505, the user may be presented with an initial display (e.g., an information display, a heading screen, etc.). At step 2510, the user may be provided with an opportunity to enter one or more of the user's material inputs. This may require the user to itemize the user's material inputs. The material inputs may include feed grains, hay, alfalfa, silage, farm equipment, pasture leases, livestock, veterinary services, and any another suitable materials. At substep 2515, the user may be provided with lists to aid with estimating the user's costs. In some embodiments, integrated risk management system 125 may provide the user with checklists and/or spreadsheets. For example, a user (e.g., a producer) may grow corn or other feed grains. The user may be required to treat this production activity (growing corn) as a separate business unit and may consider in detail the production cost of the user's corn. The production cost may be compared with the corn price in the spot market, the current basis, or in the commodities futures market. Subsequently, the user may decide to either buy or sell corn in the futures market or use it internally for feed. In some embodiments, the cost of products sold (outputs) may be evaluated. The products sold may include, for example, surplus grain, hay, cattle, replacement heifers, replacement bulls, culled cows or other livestock.

At step 2520, integrated risk management system 125 may benchmark a user's cost for inputs and outputs against others (e.g., in the local area, etc.) using information in the central database. In some embodiments, benchmarking may include identifying opportunities for improvements and cost reduction. At step 2525, information on other user's operation stored in central database can be obtained. At step 2530, the user may be provided with an assessment on the user's operation. That is, once all the input and output costs are estimated, integrated risk management system 125 may aid the user in, for example, breakeven analysis and assess the effect of a price variation of any input or output on the user's profit margin. Integrated risk management system 125 may also identify commodities for which the user may need price protection.

In some embodiments, upon assessment of the user's operation, integrated risk management system 125 may assist a user in determining when to sell his production. For example, a user may have the option of selling calves after they are weaned, backgrounded, or as fat cattle. Integrated risk management system 125 may determine when the user should make a tradeoff between a user's incremental costs, additional revenue potential from weight gain, risk of illness and associated veterinary costs, risk of death, price volatility, and interest income. This determination may require the user to restructure his operation depending on market conditions and cost. For example, at some time, it may be more profitable to sell the calves after they are weaned. However, in other years, it may be more profitable to retain ownership of calves at a custom feedlot.

In some embodiments, integrated risk management system 125 may broker relationships between users in order to minimize risks. However, brokering relationships may involve the users' consent to share financial data and any other data. The data may be archived and accessed via the central database. In some embodiments, the central database may be searched to find another user (e.g., a partner) with matching needs so that both parties can lower their risks. For example, it may be possible to negotiate a multi-year purchase agreement between a rancher and a marketing company with commitments to a retailer. This may result in minimizing the price volatility for the rancher and supply uncertainty for the marketer. In another case, a manufacturer (e.g., John Deere, Kawasaki, etc.) may reduce a user's farm equipment costs through a long-term lease. Manufacturers may offer their services through, for example, the marketplace feature of electronic commerce system 190. However, any other suitable electronic commerce system may also be used. The online brokerage feature of electronic commerce system 190 may also be used to aid in, for example, arranging a long-term private treaty between a rancher and a feedlot or a grain producer and a grain processor.

In some embodiments, integrated risk management system 125 may work in combination with electronic commerce system 190 or any other suitable electronic commerce system. For example, integrated risk management system 125 may link users to the content management system of electronic management system 190. The user may be provided with agricultural- and livestock-related news and summaries necessary for making operational decisions consistent with market conditions. The news and summaries may include cattle and crop news, commodity prices at various mercantile exchanges like the Chicago Mercantile Exchange, commentaries from veterinarians, animal scientists, epidemiologists, nutritionists, and extension people on a current topic, legislation in progress at state and federal governments, weather reports, and export markets. Integrated risk management system 125 may also provide the user with links to other related topics, such as the "hot agricultural topics of the day" like Bovine Spongiform Encephalopathy (BSE), beef check-off, grazing rights on federal lands, etc. In some embodiments, integrated risk management system 125 may provide chat sites to facilitate education and communication between users, for example, producers and industry experts. In some embodiments, users may be provided with educational resources on topics like risk management, ranch management, genetics, good management practices, etc. The educational resources may include on-line educational sessions, broadcast lectures, etc.

In some embodiments, integrated risk management system 125 may be linked to commodity exchanges and brokerage services. Integrated risk management system 125 may also provide the user with an opportunity to buy and sell futures contracts and commodity options (calls/puts) for one or more of the commodities used in a livestock industry. The commodities may include cattle, feed grains, soy, alfalfa, silage, fuel (diesel, natural gas, propane, and distillate), and transportation (rail or truck). In some embodiments, the user may interface with, for example, a commodity expert online (via voice, text, etc.) or an expert system/knowledge based tool. Integrated risk management system 125 may also provide historical data on commodity prices and any regression models developed. Integrated risk management system 125 may also assist the user in developing a financial model for his operation. Financial models may be used to evaluate one or more financial options in terms of net present value and return on investment. Subsequently, the user may decide to buy or sell futures contracts or options on various commodities such that the investment package is optimal for the user's operation.

Integrated risk management system 125 is merely illustrative of the principles of this invention. Those skilled in the art may make modifications without departing from the scope and spirit of the invention.

In some embodiments, the system may provide users with methods for obtaining feedback. Based on information, such as information stored in the central database, the system may provide consumer value system 195 which may determine marketing information and provide feedback to users, such as ranchers. Consumer value system 195 may be standalone or may be included as part of the system. Any other suitable approach may also be used.

Consumer Value System

Producers in the agricultural industry may need to plan their production based on the demands of the consumer and the future markets for their products. The demand for a producer's products is subject to competition from other products as well as changes in the demands and desires of the consumers and the marketplace. For example, the number of consumers purchasing a particular type of livestock may decline when news about a particular disease begins to spread, potentially negatively impacting the consumption of that particular livestock protein. In some embodiments, producers may need to plan their production based on other producers or users (e.g., ranchers). For example, a feedlot may want to stop buying a specific breed of cow from the producer when the producer's cows do not meet performance expectations (e.g., underperforms). The system may provide consumer value system 195, which may result in a substantial gain in cost-effectiveness so that the overall financial gain of the user's operation is improved by the use of information. Such information may include specific time and location product demands, past performance of animals a user is considering to purchase, benchmarked performance of animals as they flow through the supply chain, etc.

Figure 28:
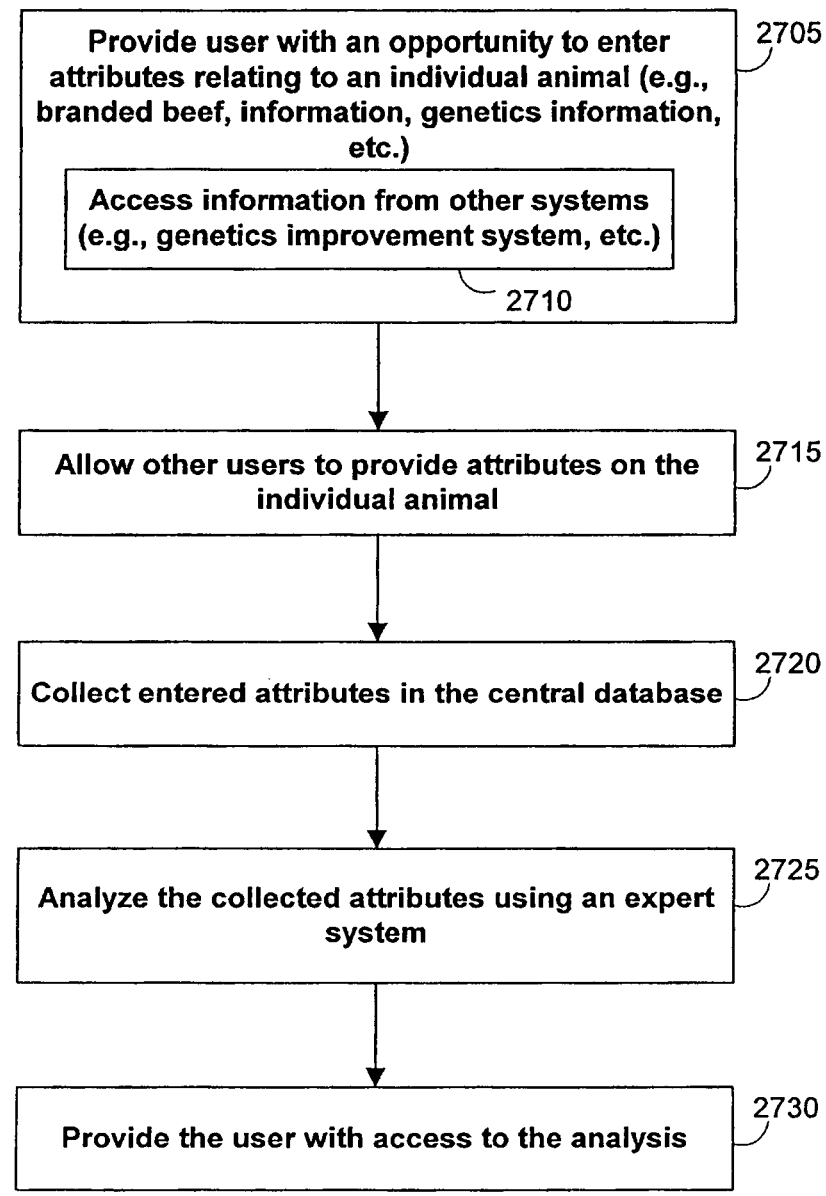
FIG. 28 is a flowchart of illustrative steps involved in providing the user with consumer value information and product alternatives using the consumer value system, in accordance with the present invention.

In some embodiments, the user may be provided with a tool for evaluating a user's product. Such tools may include software (e.g., enabled by the Internet), hardware, or any other suitable tool for evaluating the user's product. Evaluating the user's product may involve, for example, examining feedback from buyers, feedback from consumers, marketing and sales information, etc. FIG. 28 is a generalized flowchart illustrating the steps involved in providing the user with consumer value information. As shown, at step 2705, the user may be provided with an opportunity to enter attributes relating to an individual animal. Attribute information may include the branded beef program that the user has complied or enrolled with, genetics information, marbling score, and any other suitable attribute or product information. Attribute information may be entered into the system by the user (e.g., producer). At substep 2710, attribute information may be entered by accessing and obtaining the relevant attribute information from the central database. For example, consumer value system 195 may obtain genetics information from genetics improvement system 180, the central database, or other applicable systems within the overall management system. Consumer value system 195 may access information stored in the central database or may link to other existing applications or systems (e.g., certification system 160, genetic improvement system 180, environmental management system 150, tracking system 145, etc.) in the system.

In some embodiments, consumer value system 195 may allow other users (e.g., ranchers, consumers, branded beef programs, retail buyers, etc.) to provide attributes (e.g., feedback) on an individual animal (step 2715). Users may provide a rating for the product. For example, when a retail outlet purchases a specific branded beef product (e.g. Angus beef) from a packer or distributor, the user may access consumer value system 195 and input the location where the user purchased the product and rate the product (e.g., rate the quality, tenderness, marbling, flavor). This information may be available to any user of the system, such as a packer, a feedlot manager, a rancher, a veterinarian, etc. In another example, consumer value system 195 may allow users, such as animal buyers, to enter attributes. Those users may also provide a rating for the product. In this example, users may provide feedback by rating the product based on, for example, yield expectations. Consumer value system 195 may collect the entered attributes in the central database at step 2720.

In some embodiments, consumer value system 195 may analyze the collected attributes using an expert system (step 2725). Upon analyzing the collected attributes, consumer value system 195 may provide the user with access to the analysis (step 2730), thereby assisting the user in managing the multiple animals based at least in part on the analysis.

In another approach, consumer value system 195 may obtain marketing information. Marketing information may include consumer research on the products that consumers are buying, the products that consumers are not buying, seasonal fluctuations (e.g., an increase in ham purchases during the holidays), diseases currently affecting animals and its correlation with sales (e.g., Foot and Mouth, Mad Cow Disease, etc.), and any other suitable marketing information.

In some embodiments, consumer value system 195 may analyze the consumer value information and determine the user's consumer value. Users may be provided with one or more ratings for their product. For example, the user may receive a quality rating, a performance rating (e.g., how their animal performed compared with the expected performance), flavor rating, cost rating, etc. The user may receive the consumer value information for their particular animal and make decisions and improvements to their operation. For example, if a particular product continues to underperform and there is a diminishing market for the product, the user (producer) may decide to discontinue producing that product. In some embodiments, consumer value system 195 may identify other products for the user (e.g. product alternatives). Upon deciding to produce other products, the user may be provided with consumer value information on more promising products. For example, if the ratings for Angus beef are high and the user's operation is compatible for producing Angus beef, the user may decide to raise that product. The user may decide to enroll the user's animals in a branded beef program which may create a higher value for these animals.

In some embodiments, consumer value system 195 may operate in combination with electronic commerce system 190, integrated risk management system 125, or any other suitable system. For example, integrated risk management system 125 may provide the consumer value system with agricultural- and livestock-related news and summaries necessary for making operational decisions consistent with market conditions. In some embodiments, consumer value system 195 may obtain previously entered feedback information stored in the central database or any other suitable system.

Consumer value system 195 is merely illustrative of the principles of this invention. Those skilled in the art may make modifications without departing from the scope and spirit of the invention.

Thus, livestock management systems and methods are provided. It will be understood that the foregoing is only illustrative of the principles of the invention and that various modifications can be made by those skilled in the art without departing from the scope and spirit of the invention, which is limited only by the claims that follow.

We claim:

1. A method comprising:
comparing, using a computer, at least one animal quality specification for one or more animals to one or more genetics rules;
receiving, using the computer, results of one or more gene-based tests performed on the one or more animals;
determining, using the computer and based on the results, at least one attribute of the one or more animals;
comparing, using the computer, the at least one attribute to one or more genetics rules;
selecting, using the computer, one of the one or more genetics rules based at least in part on the comparison of the at least one animal quality specification to the one or more genetics rules and the comparison of the at least one attribute to the one or more genetics rules;
determining, using the computer and based on the selected genetics rule, a genetics improvement strategy; and
providing to a user the genetics improvement strategy.

2. A system comprising:
a computer configured to,
receive results of one or more gene-based tests performed on one or more animals to screen for one or more attributes;
determine at least one attribute of the one or more animals based on the results: and
sort the one or more animals into at least one subgroup based on the at least one attribute.

3. One or more computer-readable storage media having encoded thereon instructions which, when executed by a computer, cause the computer to perform a method, the method comprising:
receiving, using the computer, results of one or more gene-based tests performed on one or more animals to screen for one or more attributes;
determining, using the computer, at least one attribute of the one or more animals based on the results; and
sorting, using the computer and based on the at least one attribute, one or more animals into at least one subgroup.

4. A method comprising:
receiving, using a computer, results of one or more gene-based tests performed on one or more animals to screen for one or more attributes;
determining, using the computer, at least one attribute of the one or more animals based on the results; and
sorting, using the computer and based on the at least one attribute, one or more animals into at least one subgroup.

5. The method of claim 1, wherein the method is performed by two or more computers connected over a network.

6. The method of claim 1, further comprising sorting the one or more animals based at least in part on the genetics improvement strategy.

7. The one or more computer-readable storage media of claim 3, the method further comprising determining a genetics improvement strategy based at least in part on the results of the one or more gene-based tests.

8. The method of claim 4, further comprising performing at least one DNA test to determine the one or more gene-based test results.

9. The method of claim 1 where the at least one animal quality specification is selected from dam milking ease, dam calving ease, dam age, calving distribution, calving period, hybrid vigor, calf wean weight, dam pregnancy weight, herd pregnancy rate, dam weight at weaning, ratio of pounds of calf weaned per cow exposed, or a combination thereof.

10. The method of claim 1 where the at least one attribute is selected from tenderness, marbling, disease resistance, calving ease, feed to gain performance, or a combination thereof.

11. The method of claim 1 where the genetics improvement strategy is selected from replacement heifers, replacement bulls, sires for artificial insemination, planned mating, or a combination thereof.

12. The method of claim 1, further comprising:
   receiving, using the computer, environmental information including at least nutritional resources; and
   wherein determining the genetics improvement strategy is based on the selected genetics rule and the environmental information.

13. The method of claim 1, further comprising:
   accessing, using the computer, a central database including herd performance information for at least one other herd;
   comparing, using the computer, performance of the one or more animals to the herd performance information for the at least one other herd to determine a performance comparison; and
   wherein determining the genetics improvement strategy is based on the selected genetics rule and the performance comparison.

14. The system of claim 2 where the computer is further configured to, compare the at least one attribute to one or more genetics rules;
   select one of the one or more genetics rules based at least in part on the comparison;
   determine, based on the selected genetics rule, a genetics improvement strategy; and
   provide the genetics improvement strategy to a user.

15. The method of claim 4 where the one or more attributes are selected from tenderness, marbling, disease resistance, calving ease, feed to gain performance, or a combination thereof.

16. The method of claim 4, further comprising:
   comparing, using the computer, the at least one attribute to one or more genetics rules;
   selecting, using the computer, one of the one or more genetics rules based at least in part on the comparison; and
   determining, using the computer and based on the selected genetics rule, a genetics improvement strategy.

17. The method of claim 16 where the genetics improvement strategy is selected from replacement heifers, replacement bulls, sires for artificial insemination, planned mating, or a combination thereof.

* * * * *